United States Patent
Nishikawa et al.

(10) Patent No.: US 9,756,453 B2
(45) Date of Patent: Sep. 5, 2017

(54) WIRELESS COMMUNICATION APPARATUS, WIRELESS COMMUNICATION SYSTEM, AND CHANNEL ESTIMATING METHOD

(71) Applicant: FUJITSU LIMITED, Kawasaki-shi, Kanagawa (JP)

(72) Inventors: Kenichi Nishikawa, Kawasaki (JP); Kazuyuki Ozaki, Yokohama (JP); Kaoru Yokoo, Yokosuka (JP); Hiroshi Fujita, Yokosuka (JP); Hiroo Urabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/993,227

(22) Filed: Jan. 12, 2016

(65) Prior Publication Data
US 2016/0255655 A1    Sep. 1, 2016

(30) Foreign Application Priority Data

Feb. 27, 2015    (JP) .................................. 2015-038933

(51) Int. Cl.
*H04W 72/04*    (2009.01)
*H04W 4/00*    (2009.01)
(Continued)

(52) U.S. Cl.
CPC ....... *H04W 4/005* (2013.01); *H04W 52/0216* (2013.01); *H04W 52/0219* (2013.01);
(Continued)

(58) Field of Classification Search
CPC .......... H04W 4/00; H04W 52/02; H04L 5/00; H04L 1/00; Y02B 60/50
See application file for complete search history.

(56) References Cited

U.S. PATENT DOCUMENTS

| 2006/0013285 | A1* | 1/2006 | Kobayashi | ........... H04B 1/7143 375/132 |
| 2015/0207611 | A1* | 7/2015 | Jung | ...................... H04J 11/004 370/329 |
| 2015/0282191 | A1* | 10/2015 | Luo | ...................... H04W 72/082 455/452.1 |

FOREIGN PATENT DOCUMENTS

JP    2007-282120    10/2007

OTHER PUBLICATIONS

Takeo Ohgane et al., "Applications of Space Division Multiplexing and Those Performance in a MIMO Channel", IEICE Trans. Commun., vol. E88-B, No. 5, May 2005, pp. 1843-1851 (9 pages).

* cited by examiner

*Primary Examiner* — Lakeram Jangbahadur
(74) *Attorney, Agent, or Firm* — Fujitsu Patent Center

(57) ABSTRACT

A wireless communication apparatus includes antenna elements, each receiving a first signal and a second signal, a first estimator that estimates first channel information of the first signal, a false signal generator that generates false signals that are equal in number to or greater in number than the number of the antenna elements, each of the false signals arriving from a unique direction that is different from a direction of arrival of the first signal, a weight generator that generates first weights, each being associated with a corresponding one of the false signals and forming a null in the direction of arrival of the first signal, a multiplier that multiplies a signals received by the respective antenna elements by the first weights to acquire weight-multiplied signals, and a second estimator that estimates second channel information of the second signal using the weight-multiplied signals.

8 Claims, 13 Drawing Sheets

(51) Int. Cl.
*H04W 52/02* (2009.01)
*H04L 1/00* (2006.01)
*H04L 5/00* (2006.01)

(52) U.S. Cl.
CPC .............. *H04L 1/0027* (2013.01); *H04L 5/00* (2013.01); *Y02B 60/50* (2013.01)

WIRELESS COMMUNICATION APPARATUS, WIRELESS COMMUNICATION SYSTEM, AND CHANNEL ESTIMATING METHOD

CROSS-REFERENCE TO RELATED APPLICATION

This application is based upon and claims the benefit of priority of the prior Japanese Patent Application No. 2015-038933, filed on Feb. 27, 2015, the entire contents of which are incorporated herein by reference.

FIELD

The embodiments discussed herein are related to a wireless communication apparatus, a wireless communication system, and a channel estimating method.

BACKGROUND

The IEEE 802.11 and IEEE 802.15.4 standards, which are recently prevailing wireless communication standards, employ an access method called Carrier Sense Multiple Access with Collision Avoidance (CSMA/CA). In CSMA/CA, each wireless terminal performs a carrier sense before transmitting a signal. The wireless terminal, when having detected signal transmission by another wireless terminal, does not transmit its signal. The wireless terminal, when not having detected signal transmission by another wireless terminal, transmits its signal.

Consider a plurality of wireless terminals that are remotely located from each other and are difficult to communicate with each other. Each of the wireless terminals is difficult to detect a signal transmitted by another terminal. As a result, one wireless terminal may transmit a signal at a timing at which another wireless terminal is transmitting its signal. In this case, a plurality of signals can arrive at a single timing at an access point that receives signals from a plurality of wireless terminals, so that a collision occurs between the signals. The portion at which the collision occurs between the signals results in degraded reception quality, so that decoding may become difficult.

Wireless sensor networks (WSNs), in particular, typically involve low antenna gain of wireless terminals. Thus, the carrier sense does not work well at signal transmission and signal collisions tend to occur at the access point.

If the signals that collided with each other can be separated and decoded at the access point, throughput can be improved and retransmission of a signal from a wireless terminal can be prevented to achieve power saving of the wireless terminal.

One known technique to separate the collided signals at the access point uses channel information of each of the collided signals. If the channel information of each of the collided signals can be estimated, the collided signals can be separated from each other.

One channel information estimating technique calculates, as will be described below, a "preamble correlation value" that represents a correlation value between a preamble at the start of a signal and a known preamble sequence.

Specifically, as illustrated in FIG. 1, while a preceding signal arrives at an access point, a subsequent signal arrives at the access point following the preceding signal and a collision between the preceding signal and the subsequent signal occurs at the access point. FIG. 1 is an example diagram of a collision between the preceding signal and the subsequent signal. The preceding signal and the subsequent signal each have a packet format illustrated in FIG. 1, for example, and include a preamble (PA), a header, data, and a cyclic redundancy check (CRC) bit. Assume that the subsequent signal arrives with a delay of a preamble length or more from the start of the preceding signal. Specifically, while the preamble of the preceding signal does not overlap the subsequent signal, the preamble of the subsequent signal overlaps the preceding signal.

Let $S_1(t)$ be the preceding signal illustrated in FIG. 1, let $h_1$ be channel information of the preceding signal, and let $n(t)$ be noise. Then, a received signal $y(t)$ at the access point at the preamble portion of the preceding signal is expressed by expression (1), where $y(t)$ is the received signal at a time-of-day t, $S_1(t)$ is the preceding signal at the time-of-day t, and $n(t)$ is noise at the time-of-day t.

$$y(t)=h_1 S_1(t)+n(t) \quad (1)$$

Let N be a preamble length. Then, a preamble correlation value $K_1$ of the preceding signal is calculated using expression (2) and the preamble correlation value $K_1$ can be regarded as the channel information $h_1$ of the preceding signal. Specifically, when the preamble of the preceding signal does not overlap the subsequent signal, the preamble correlation value of the preceding signal is directly an estimated value of the channel information of the preceding signal.

$$K_1 = \frac{1}{N}\sum_{t=0}^{N-1} h_1 S_1(t) S_1(t)^* + n(t)S_1(t)^* \quad (2)$$
$$\approx h_1$$

Let $S_2(t)$ be the subsequent signal illustrated in FIG. 1 and let $h_2$ be channel information of the subsequent signal. Then, the received signal $y(t)$ at the access point at the preamble portion of the subsequent signal is expressed by expression (3). Thus, a preamble correlation value $K_2$ of the subsequent signal is calculated using expression (4). $S_2(t)$ is the subsequent signal at the time-of-day t.

$$y(t) = h_1 S_1(t) + h_2 S_2(t) + n(t) \quad (3)$$

$$K_2 = \frac{1}{N}\sum_{t=0}^{N-1} h_1 S_1(t)S_2(t)^* + h_2 S_2(t)S_2(t)^* + n(t)S_2(t)^*(t) \quad (4)$$
$$\approx \frac{1}{N}\sum_{t=0}^{N-1} h_1 S_1(t)S_2(t)^* + h_2$$

Because the preceding signal interferes with the preamble of the subsequent signal, the term of the preceding signal is left in the preamble correlation value $K_2$ of the subsequent signal as depicted in expression (4). Thus, accuracy in estimating the channel information of the subsequent signal is degraded.

To enhance the accuracy in estimating the channel information of the subsequent signal, one possible approach is to remove the preceding signal from the received signal. To achieve this purpose, a directivity pattern that forms a null in a direction of arrival of the preceding signal is formed using null-steering that uses an antenna array including a plurality of antenna elements. The directivity pattern is formed by multiplying the received signal by a weight.

Examples of related-art are described in Japanese Laid-open Patent Publication No. 2007-282120. Further, examples of related-art are described in "Applications of Space Division Multiplexing and Those Performance in a MIMO Channel", IEICE Trans. Commun., vol. E88-B, No. 5, May 2005, pp. 1843-1851.

The following is a preamble correlation value calculated with respect to the received signal multiplied by the weight (hereinafter may be referred to as a "weight-multiplied signal"). The weight-multiplied signal here is a result of removal of the preceding signal from the received signal by null-steering.

Specifically, let Nr be the number of antenna elements that constitute the antenna array, let $h_1$ (Nr×1 vector, $[h_{11}, h_{12}, \ldots, h_{1Nr}]^T$) be channel information of the preceding signal corresponding to each of the antenna elements, let $h_2$ (Nr×1 vector, $[h_{21}, h_{22}, \ldots, h_{2Nr}]^T$) be channel information of the subsequent signal corresponding to each of the antenna elements, and let W (1×Nr vector, $[W_1, \ldots, W_{Nr}]$) be a weight. Then, the weight-multiplied signal is expressed by expression (5). It is noted that the channel information and the weight are expressed by vector, and that the channel information may be called a "channel vector" and the weight may be called a "weight vector".

$$Wy(t)=(w_1h_{11}+\ldots+w_{Nr}h_{1Nr})S_1(t)+ (w_1h_{21}+\ldots+w_{Nr}h_{2Nr})S_2(t)+Wn(t) \quad (5)$$

Because the multiplication of the received signal y by the weight W forms a null in the direction of arrival of the preceding signal, the term of the preceding signal in expression (5) is substantially 0. Thus, the weight-multiplied signal can be expressed by expression (6).

$$Wy(t)=(w_1h_{11}+\ldots w_{Nr}h_{1Nr})S_1(t)+ (w_1h_{21}+\ldots w_{Nr}h_{2Nr})S_2(t)+ Wn(t)\approx(w_1h_{21}+\ldots w_{Nr}h_{2Nr})S_2(t)+Wn(t) \quad (6)$$

A preamble correlation value K of the weight-multiplied signal given in expression (6) is calculated using expression (7). The weight-multiplied signal corresponds to the received signal including the preceding signal and the subsequent signal, from which the preceding signal is removed. Thus, the preamble correlation value K calculated using expression (7) corresponds to the preamble correlation value of the subsequent signal.

$$K = \frac{1}{N}\Sigma(w_1h_{21}+\ldots w_{Nr}h_{2Nr})S_2(t)S_2(t)^* + Wn(t)S_2(t)^* \quad (7)$$
$$= w_1h_{21} + w_2h_{22} + \ldots + w_{Nr}h_{2Nr}$$

In expression (7), while the weight W and the preamble correlation value K are known values, pieces of channel information $h_{21}, h_{22}, \ldots, h_{2Nr}$ are unknown values. Given the pieces of channel information $h_{21}, h_{22}, \ldots, h_{2Nr}$ that exist in number corresponding to the number of the antenna elements Nr, the preceding signal and the subsequent signal that collide with each other can be separated from each other.

However, the calculation of the preamble correlation value of the subsequent signal using the weight-multiplied signal as depicted in expression (7) makes it difficult to uniquely determine Nr pieces of channel information $h_{21}, h_{22}, \ldots, h_{2Nr}$ of the subsequent signal due to the only one equation available for Nr unknown values. As described above, despite the multiplication of the received signal by the weight performed for enhancing the accuracy in estimating the channel information of the subsequent signal, the very multiplication by the weight makes it difficult to uniquely determine the channel information of the subsequent signal. The difficulty in uniquely determining the channel information of the subsequent signal makes it difficult to separate the preceding signal and the subsequent signal that collide with each other from each other.

SUMMARY

According to an aspect of an embodiment, a wireless communication apparatus includes a plurality of antenna elements, each receiving a received signal that includes a first signal and a second signal that collides with the first signal, a first estimator that estimates first channel information that represents channel information of the first signal, a false signal generator that generates a plurality of false signals that are equal in number to or greater in number than the number of the antenna elements, each of the false signals arriving from a unique direction that is different from a direction of arrival of the first signal and different from directions of arrival of other false signals, a weight generator that generates a plurality of first weights, each of the first weights being associated with a corresponding one of the false signals and forming a null in the direction of arrival of the first signal, a multiplier that multiplies the received signals received by the respective antenna elements by the first weights to acquire weight-multiplied signals, and a second estimator that estimates second channel information that represents channel information of the second signal using the weight-multiplied signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
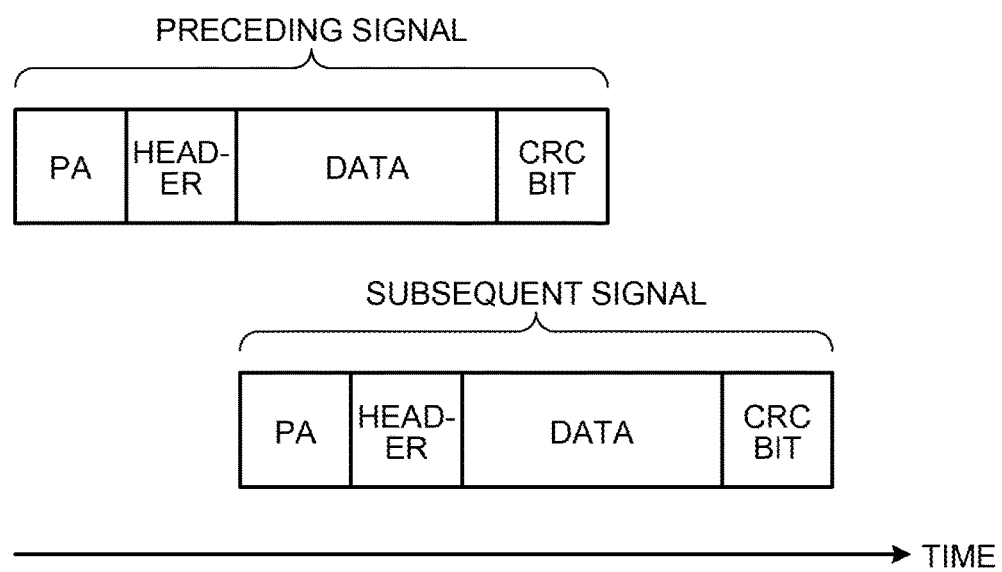
FIG. 1 is an example diagram of a collision between a preceding signal and a subsequent signal.

Preferred embodiments of the present invention will be explained with reference to accompanying drawings. It is to be understood that these embodiments are not restrictive of the disclosed wireless communication apparatus, wireless communication system, and channel estimating method, as claimed. Corresponding configurations having identical functions and corresponding steps performing identical processing in all embodiments are denoted by the same reference numerals and duplicate descriptions will be omitted.

[a] First Embodiment

Configuration of Wireless Communication System

Figure 2:
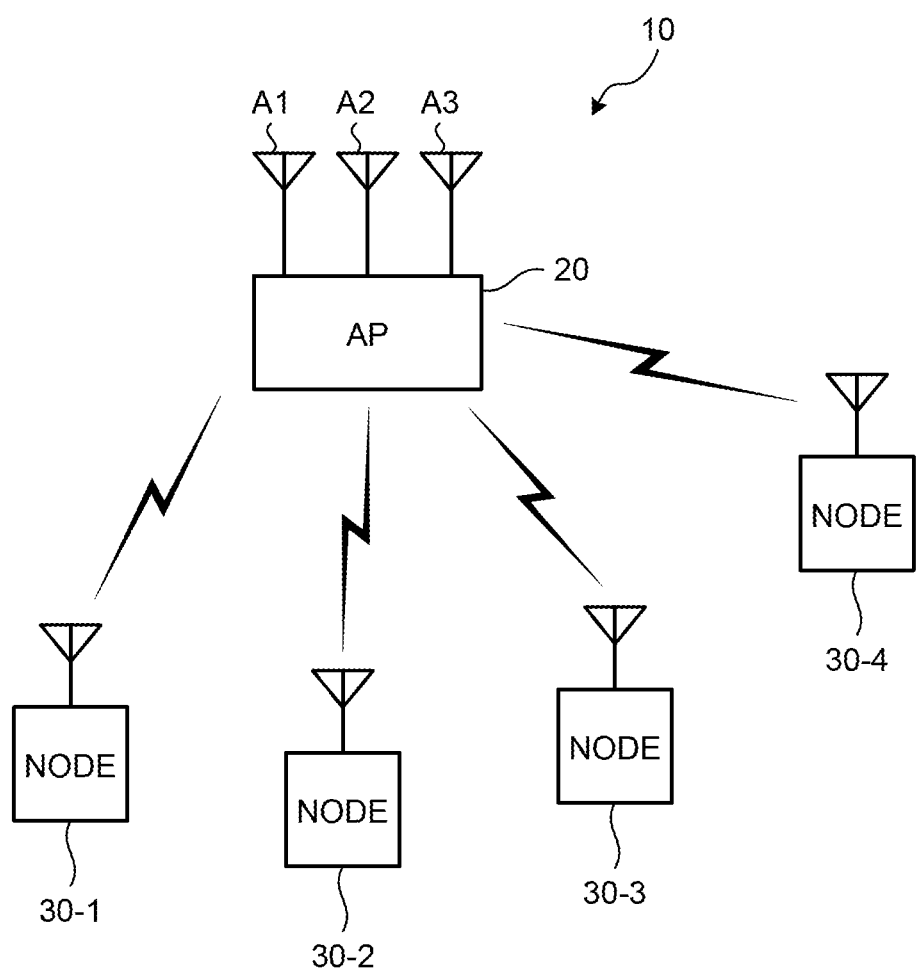
FIG. 2 is an example diagram of a configuration of a wireless communication system according to a first embodiment.

FIG. 2 is an example diagram of a configuration of a wireless communication system according to a first embodiment. FIG. 2 exemplarily illustrates an access point and a wireless terminal as the wireless communication apparatus. In the following, the access point may be denoted as an "AP" and the wireless terminal as a "node". This wireless communication system 10 illustrated in FIG. 2 is, for example, a wireless sensor networks (WSNs) system including an AP 20 and nodes 30-1 to 30-4. The AP 20 includes an antenna array including antenna elements A1, A2, and A3 and thus can perform directional communication with the nodes 30-1 to 30-4 around the AP 20. In the following, the nodes 30-1 to 30-4, when they do not need to be differentiated from one another, may be collectively referred to as a node 30. Additionally, although FIG. 2 exemplarily illustrates four nodes, an unlimited number of nodes can communicate with the AP 20.

Operation of Wireless Communication System

Figure 3:
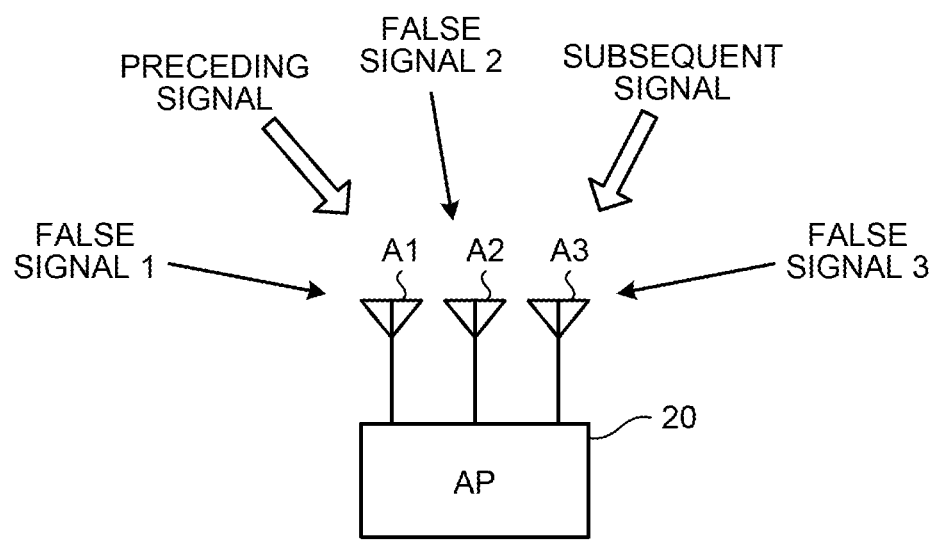
FIG. 3 is a diagram for illustrating an example operation of an access point according to the first embodiment.
Figure 4:
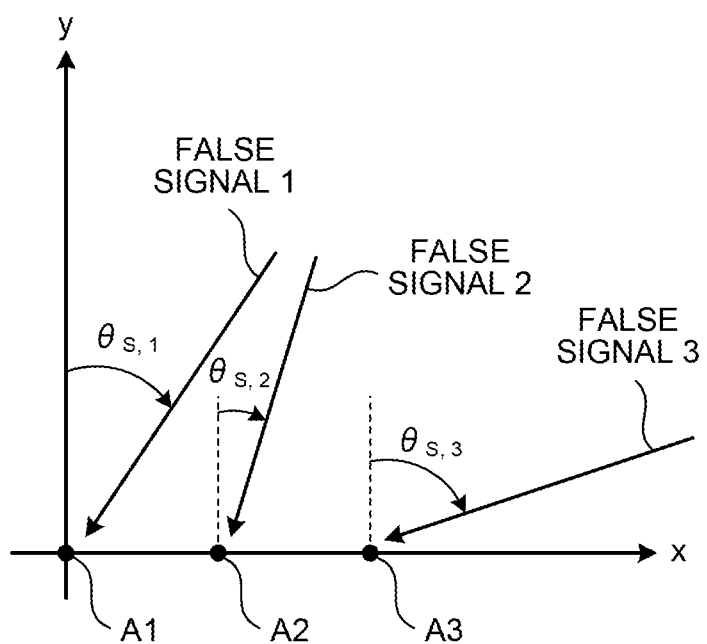
FIG. 4 is a diagram for illustrating an example operation of the access point according to the first embodiment.
Figure 5:
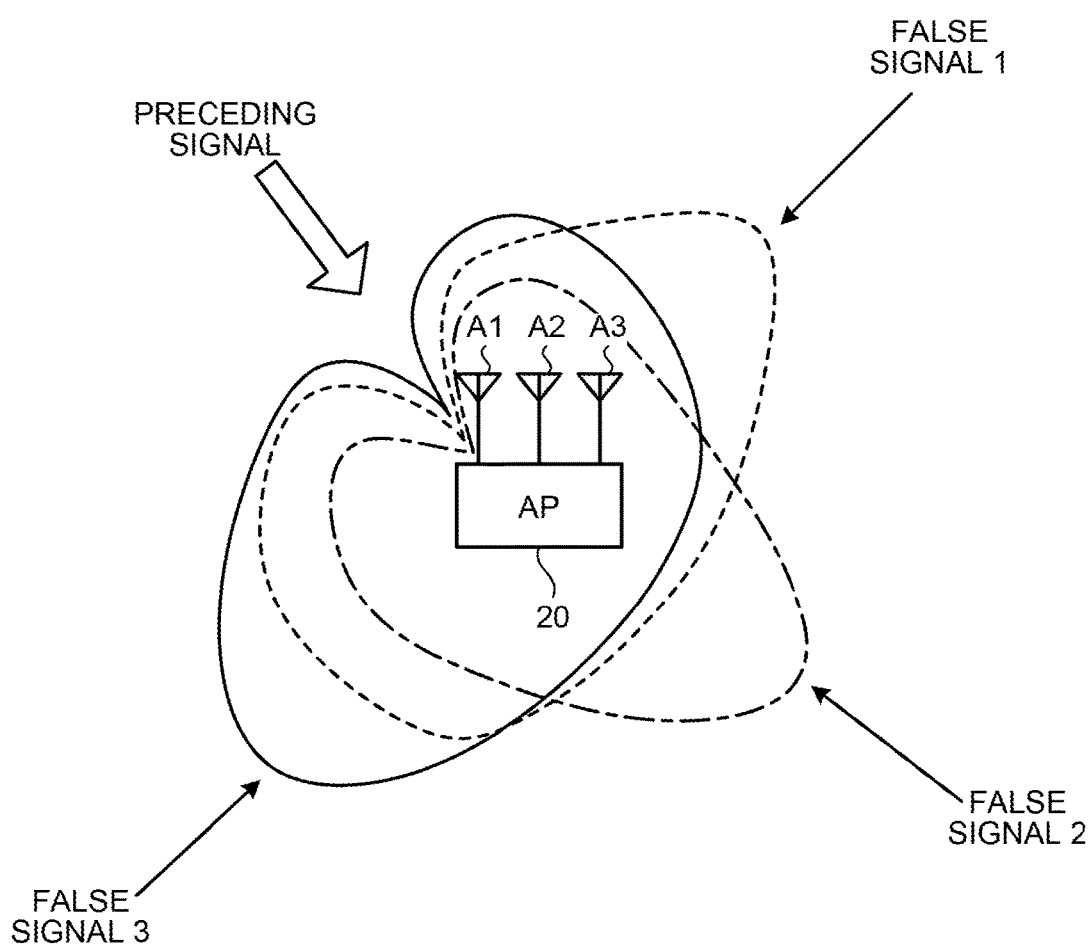
FIG. 5 is a diagram for illustrating an example operation of the access point according to the first embodiment.

FIGS. 3, 4, and 5 are each a diagram for illustrating an example operation of an access point according to the first embodiment. As in FIG. 1, the first embodiment assumes that, while a preceding signal arrives at the AP 20, a subsequent signal arrives at the AP 20 following the preceding signal and a collision between the preceding signal and the subsequent signal occurs at the AP 20. Specifically, a received signal at the AP 20 includes the preceding signal and the subsequent signal that collides with the preceding signal. In addition, because the preceding signal and the subsequent signal are transmitted from different nodes, a direction of arrival of the preceding signal differs from a direction of arrival of the subsequent signal.

As illustrated in FIG. 3, the antenna elements A1, A2, and A3 included in the AP 20 receive both the preceding signal and the subsequent signal.

The received signal $y(t)$ (Nr×1 vector, $[y_1, y_2, \ldots, y_{Nr}]^T$) at the AP 20 at the preamble portion of the preceding signal illustrated in FIG. 1 is expressed by expression (1). Thus, the AP 20 first calculates the preamble correlation value $K_1$ of the preceding signal using expression (2) to thereby estimate the channel information $h_1$(Nr×1 vector, $[h_1, h_{12}, \ldots, h_{Nr1}]^T$) of the preceding signal. Here, $y_1$ is the received signal of a first antenna element (specifically, the antenna element A1), $y_2$ is the received signal of a second antenna element (specifically, the antenna element A2), ..., and $y_{Nr}$ is the received signal of an Nr-th antenna element. Similarly, $h_{11}$ is the channel information of the preceding signal at the first antenna element, $h_{12}$ is the channel information of the preceding signal at the second antenna element, . . . , and $h_{1Nr}$ is the channel information of the preceding signal at the Nr-th antenna element. The noise $n(t)$ in expression (1) is an Nr×1 vector $([n_1, n_2, \ldots, n_{Nr}])$. Here, $n_1$ is a noise signal at the first antenna element, $n_2$ is a noise signal at the second antenna element, . . . , and $n_{Nr}$ is a noise signal at the Nr-th antenna element.

The AP 20 next estimates a direction of arrival $\theta_a$ of the preceding signal using expression (8). In expression (8), d denotes a distance between two adjacent antenna elements and $\theta_{dif1}$ denotes a phase difference of the channel information $h_1$ between the two adjacent antenna elements.

$$\theta_a = \sin^{-1}\left(\frac{\lambda d\theta_{dif1}}{2\pi}\right) \quad (8)$$

Then, the AP 20 generates Ng "false signals" that are equal in number to or greater in number than the number of the antenna elements. As illustrated in FIG. 3, the AP 20 includes the three antenna elements of the antenna elements A1, A2, and A3 and generates, for example, three false signals 1, 2, and 3 that are equal in number to the number of the antenna elements. The three false signals 1, 2, and 3 here are assumed to arrive from a direction that differs from the direction of arrival of the preceding signal. The three false signals 1, 2, and 3 are further assumed to arrive from directions different from each other.

For example, as illustrated in FIG. 4, the false signal 1 is assumed to arrive from a direction that forms an angle $\theta_{s,1}$ with respect to a plane y that is perpendicular to a plane x on which the antenna elements A1, A2, and A3 are placed. The false signal 2 is assumed to arrive from a direction that forms an angle $\theta_{s,2}$ with respect to the plane y. The false signal 3 is assumed to arrive from a direction that forms an angle $\theta_{s,3}$ with respect to the plane y. The directions of arrival $\theta_{s,1}$, $\theta_{s,2}$, and $\theta_{s,3}$ differ from the direction of arrival of the preceding signal and differ from each other. Thus, the directions of arrival $\theta_{s,1}$, $\theta_{s,2}$, and $\theta_{s,3}$ are preferably random. It is noted that the false signals 1, 2, and 3 are each to arrive at the AP 20 through a single path, and not through multiple paths.

Let i (i being an integer from 1 to Ng) be an identification number assigned to the false signal. Then, channel information $Vs_i$(Nr×1 vector) of the false signal is expressed by expression (9) using the direction of arrival $\theta_{s,1}$ of the false signal. In expression (9), x denotes a distance vector (Nr×1 vector, $[x_1, x_2, \ldots, x_{Nr}]T$) between a reference point established by defining any one of the antenna elements and each of other antenna elements. For example, a channel information vector $Vs_1$ of the false signal 1 is denoted as $[Vs_{11}, Vs_{12}, \ldots, Vs_{Nr}]^T$, a channel information vector $Vs_2$ of the false signal 2 is denoted as $[Vs_{21}, Vs_{22}, \ldots, Vs_{2Nr}]^T$, and a channel information vector $Vs_3$ of the false signal 3 is denoted as $[Vs_{31}, Vs_{32}, \ldots, Vs_{3Nr}]^T$.

$$Vs_i = \exp(-j2\pi x \sin \theta_{s,i}) \quad (9)$$

As illustrated in FIG. 5, the AP 20 generates a plurality of weights $W_{opt,i}$ (1×Nr vector). Each of the weights $W_{opt,i}$ is associated with a corresponding false signal i of the false signals and each of the weights $W_{opt,i}$ forms a null in the direction of arrival $\theta_a$ of the preceding signal. For example, $W_{opt,1}$ associated with the false signal 1 is denoted as $[W_{opt,11}, W_{opt,12}, \ldots, W_{opt,1Nr}]$, $W_{opt,2}$ associated with the false signal 2 is denoted as $[W_{opt,21}, W_{opt,22}, \ldots, W_{opt,2Nr}]$, and $W_{opt,3}$ associated with the false signal 3 is denoted as $[W_{opt,31}, W_{opt,32}, \ldots, W_{opt,3Nr}]$. The received signal of a first antenna element (specifically, the antenna element A1) is multiplied by the weight $W_{opt,11}, W_{opt,21}$, and $W_{opt,31}$, the received signal of a second antenna element (specifically, the antenna element A2) is multiplied by the weight $W_{opt,12}$, $W_{opt,22}$, and $W_{opt,32}$, and the received signal of an Nr-th antenna element is multiplied by the weight $W_{opt,1Nr}$, $W_{opt,2Nr}$, and $W_{opt,3Nr}$. Because the weights $W_{opt,i}$ assume values different from each other, beam patterns formed by the respective weights $W_{opt,i}$ have shapes different from each other as illustrated in FIG. 5. To make the beam pattern shapes different from each other, for example, as illustrated in FIG. 5, the weights $W_{opt,i}$ are preferably generated so as to form beams in the respective directions of arrival of the false signals. The weights $W_{opt,i}$ are given by, for example, the Wiener solution and expressed by expressions (10), (11), and (12) In expressions (10), (11), and (12), $Rxx_i$ denotes a correlation matrix, $rxr_i$ denotes a correlation vector, Ps denotes electric power of the false signal, Pu denotes electric power of the preceding signal, Pn denotes electric power of the noise, and I denotes a unit matrix.

$$W_{opt,i} = \operatorname{inv}(Rxx_i) rxr_i \quad (10)$$

$$rxr_i = P_s \exp(-j2\pi x \sin\theta_{s,i}) \quad (11)$$

$$Rxx_i = P_s Vs_i Vs_i^H + P_u h_1 h_1^H + P_n I \quad (12)$$

The AP 20 multiplies the received signal y(t) by the weight $W_{opt,i}$ as expressed by expression (13).

$$W_{opt,i} y(t) = W_{opt,i}(h_1 S_1(t) + h_2 S_2(t) + n(t)) \approx W_{opt,i}(h_2 S_2(t) + n(t)) \quad (13)$$

The AP 20 calculates the preamble correlation value $k_i$ of the weight-multiplied signal (expression (13) for each of the false signals using expression (14). The weight-multiplied signal given in expression (13) corresponds to the received signal including a preceding signal and a subsequent signal, from which the preceding signal is removed, specifically, the subsequent signal. Thus, the preamble correlation value $k_i$ calculated using expression (14) corresponds to the preamble correlation value of the subsequent signal.

$$k_i = \frac{1}{N} \sum_{t=0}^{N-1} w_{opt,i} y(t) S_2^*(t) \quad (14)$$

$$\approx w_{opt,i} h_2$$

The AP 20 determines whether any of the preamble correlation values $k_i$ of the false signals is equal to or greater than a threshold. If all of the preamble correlation values $k_i$ are smaller than the threshold, the AP 20 determines that a subsequent signal is not included in the received signal. The received signal, when not including a subsequent signal, is equal to a preceding signal. Thus, the AP 20, when having determined that the received signal does not include the subsequent signal, determines that no collision of signals occurs and directly decodes the received signal.

If any of the preamble correlation values $k_i$ is equal to or greater than the threshold, the AP 20 determines that the received signal includes a subsequent signal and determines that a collision of signals occurs. In this case, the AP 20 separates the preceding signal from the subsequent signal as follows.

Specifically, the AP 20 establishes simultaneous equations as depicted in expression (15) on the basis of the preamble correlation values $k_i$ ($k_1, k_2, \ldots, k_{Ng}$) calculated using expression (14).

$$[k_1, \ldots, k_{Ng}]^T = [W_{opt,1}^T, \ldots, W_{opt,Ng}^T]^T h_2 \quad (15)$$

The AP 20 estimates the channel information $h_2$ (Nr×1 vector, $[h_{21}, h_{22}, \ldots, h_{2Nr}]^T$) of the subsequent signal using expression (16) in which expression (15) is solved for $h_2$. Specifically, the AP 20 solves the simultaneous equations depicted in expression (16) to thereby estimate the channel information $h_2$ of the subsequent signal. In expression (16), the superscript "+" denotes a generalization inverse matrix. The generalization inverse matrix is calculated as depicted in expression (17).

$$h_2 = ([W_{opt,1}^T, \ldots, W_{opt,Ng}^T]^T)^+ [k_1, \ldots, k_{Ng}] \quad (16)$$

$$([W_{opt,1}^T, \ldots, W_{opt,Ng}^T]^T)^+ =$$
$$(([W_{opt,1}^T, \ldots, W_{opt,Ng}^T]^T)^H$$
$$([W_{opt,1}^T, \ldots, W_{opt,Ng}^T]^T))^{-1}$$
$$([W_{opt,1}^T, \ldots, W_{opt,Ng}^T]^T)^H \quad (17)$$

The pieces of channel information $h_{21}, h_{22}, \ldots, h_{2Nr}$ of the subsequent signal exist in number equal to the number of antenna elements Nr. In contrast, equations included in the simultaneous equations given by expression (16) exist in number equal to the number of the false signals Ng, specifically, identical to or greater than the number of antenna elements Nr. Thus, the AP 20 can uniquely determine the Nr pieces of channel information $h_{21}, h_{22}, \ldots, h_{2Nr}$ of the subsequent signal by solving the simultaneous equations depicted in expression (16) for the channel information $h_{21}, h_{22}, \ldots, h_{2Nr}$ of the subsequent signal. The weights $W_{opt,i}$ each form a null in the direction of arrival $\theta_a$ of the preceding signal. Thus, the multiplication of the received signal y(t) by the weights $W_{opt,i}$ removes the preceding signal $S_1(t)$ from the received signal y(t), so that accuracy in estimating the channel information $h_2$ of the subsequent signal can be enhanced.

The AP 20 uses the channel information $h_1$ of the preceding signal and the channel information $h_2$ of the subsequent signal to separate the received signal y(t) into the preceding signal $S_1(t)$ and the subsequent signal $S_2(t)$. The AP 20 further decodes the separated preceding signal $S_1(t)$ and subsequent signal $S_2(t)$.

Assume, for example, that the AP 20 includes two antenna elements. Then, the received signal y(t) may be expressed in a matrix format as depicted in expression (18).

$$\begin{pmatrix} y_1 \\ y_2 \end{pmatrix} = \begin{pmatrix} h_{11} & h_{12} \\ h_{21} & h_{22} \end{pmatrix} \begin{pmatrix} S_1 \\ S_2 \end{pmatrix} + \begin{pmatrix} n_1 \\ n_2 \end{pmatrix} \quad (18)$$

Assume, for example, that no noise is involved in expression (18). The preceding signal $S_1$ and the subsequent signal $S_2$ are expressed by expression (19) using an inverse matrix of the channel information.

$$\begin{pmatrix} S_1 \\ S_2 \end{pmatrix} = \begin{pmatrix} h_{11} & h_{12} \\ h_{21} & h_{22} \end{pmatrix}^{-1} \begin{pmatrix} y_1 \\ y_2 \end{pmatrix} \quad (19)$$

The AP 20 then multiplies the received signal by the inverse matrix formed from the channel information $h_1$ of the preceding signal and the channel information $h_2$ of the subsequent signal to thereby separate the received signal into the preceding signal $S_1$ and the subsequent signal $S_2$.

Configuration of Access Point

Figure 6:
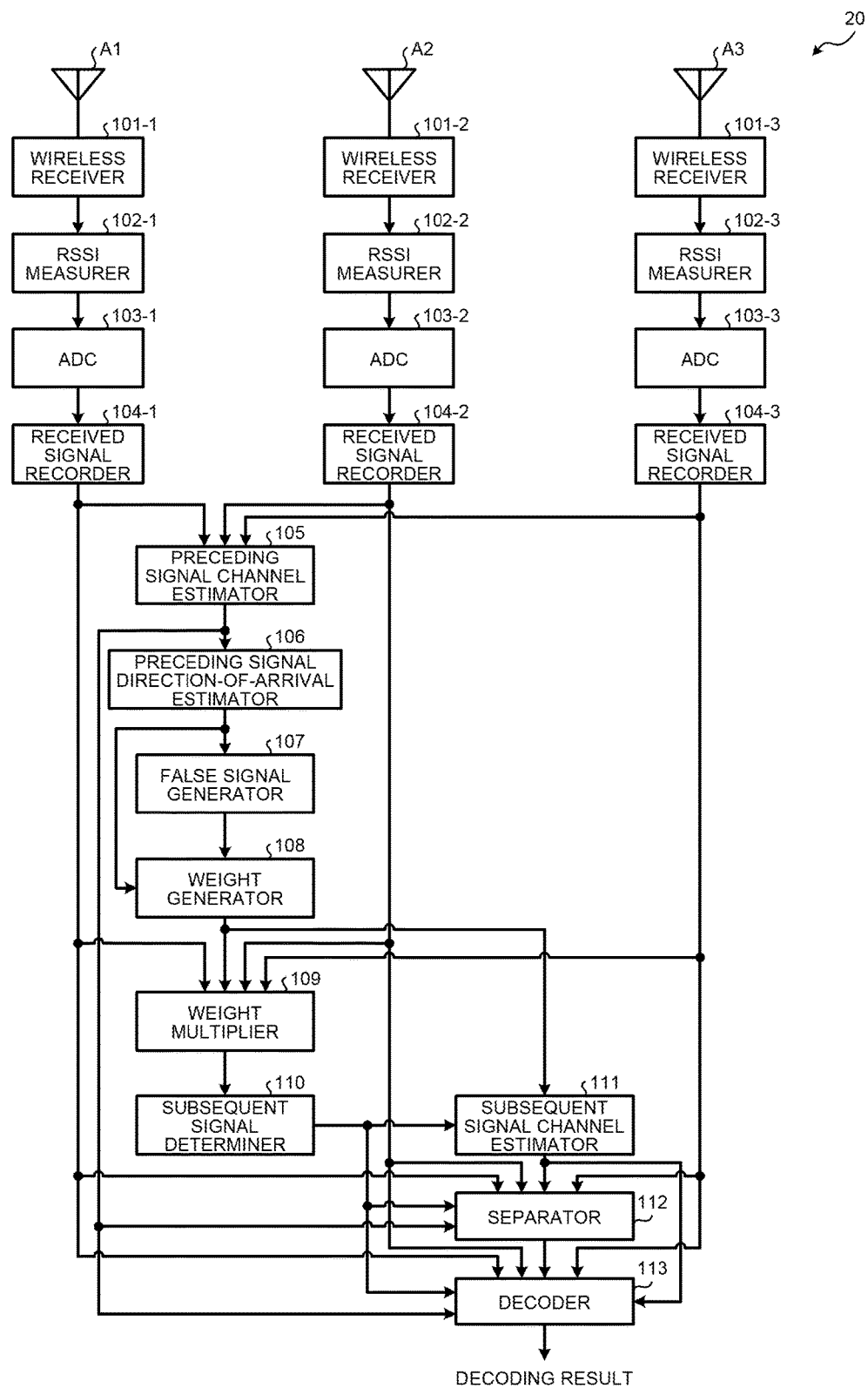
FIG. 6 is an example functional block diagram of a configuration of the access point according to the first embodiment.

FIG. 6 is an example functional block diagram of a configuration of the access point according to the first embodiment.

In FIG. 6, the AP 20 includes the antenna elements A1, A2, and A3. The AP 20 further includes, with respect to the antenna element A1, a wireless receiver 101-1, a received signal strength indicator (RSSI) measurer 102-1, an analog-to-digital converter (ADC) 103-1, and a received signal recorder 104-1. The AP 20 further includes, with respect to the antenna element A2, a wireless receiver 101-2, an RSSI measurer 102-2, an ADC 103-2, and a received signal recorder 104-2. The AP 20 further includes, with respect to the antenna element A3, a wireless receiver 101-3, an RSSI measurer 102-3, an ADC 103-3, and a received signal recorder 104-3. FIG. 6 exemplarily illustrates three antenna elements. Thus, Nr in the following represents "3". Nonetheless, the number of antenna elements included in the AP 20 is not limited to three only. Preferably, the number of antenna elements included in the AP 20 is determined according to a maximum number of signals that can collide with each other.

In addition, the AP 20 includes a preceding signal channel estimator 105, a preceding signal direction-of-arrival estimator 106, a false signal generator 107, a weight generator 108, a weight multiplier 109, a subsequent signal determiner 110, a subsequent signal channel estimator 111, a separator 112, and a decoder 113.

The wireless receiver 101-1 performs predetermined wireless processing including downconversion on the signal received by the antenna element A1 and outputs the received signal that has undergone the wireless processing to the RSSI measurer 102-1. The wireless receiver 101-2 performs predetermined wireless processing including downconversion on the signal received by the antenna element A2 and outputs the received signal that has undergone the wireless processing to the RSSI measurer 102-2. The wireless receiver 101-3 performs predetermined wireless processing including downconversion on the signal received by the antenna element A3 and outputs the received signal that has undergone the wireless processing to the RSSI measurer 102-3.

The RSSI measurer 102-1 measures an RSSI value of the antenna element A1. The RSSI measurer 102-1 outputs a received signal having an RSSI value equal to or greater than a threshold Th to the ADC 103-1 and does not output a received signal having an RSSI value smaller than the threshold Th to the ADC 103-1. The RSSI measurer 102-2 measures an RSSI value of the antenna element A2. The RSSI measurer 102-2 outputs a received signal having an RSSI value equal to or greater than the threshold Th to the ADC 103-2 and does not output a received signal having an RSSI value smaller than the threshold Th to the ADC 103-2. The RSSI measurer 102-3 measures an RSSI value of the antenna element A3. The RSSI measurer 102-3 outputs a received signal having an RSSI value equal to or greater than the threshold Th to the ADC 103-3 and does not output a received signal having an RSSI value smaller than the threshold Th to the ADC 103-3.

The ADCs 103-1, 103-2, and 103-3 convert an analog received signal to a corresponding digital received signal and outputs the converted digital received signal to the received signal recorders 104-1, 104-2, and 104-3, respectively.

The received signal recorder 104-1 records the received signal of the antenna element A1. The received signal recorder 104-2 records the received signal of the antenna element A2. The received signal recorder 104-3 records the received signal of the antenna element A3. Preferably, the received signal has a record length that is equal to or smaller than a maximum packet length multiplied by the number of antenna elements Nr.

The preceding signal channel estimator 105 calculates the preamble correlation value $K_1$ of the preceding signal using the received signal recorded by the received signal recorders 104-1, 104-2, and 104-3 and using expression (2), to thereby estimate the channel information $h_1$ of the preceding signal. The preceding signal channel estimator 105 outputs the estimated channel information $h_1$ to the preceding signal direction-of-arrival estimator 106, the separator 112, and the decoder 113.

The preceding signal direction-of-arrival estimator 106 estimates the direction of arrival $\theta_a$ of the preceding signal using expression (8) and outputs the estimated direction of arrival $\theta_a$ to the false signal generator 107 and the weight generator 108.

The false signal generator 107 generates false signals that are equal in number to or greater in number than the number of antenna elements Nr. Since the AP 20 includes the three antenna elements A1, A2, and A3, the false signal generator 107 generates, for example, the three false signals 1, 2, and 3 that are equal in number to the number of the antenna elements. Specifically, i=1, 2, and 3. The directions of arrival of the three false signals 1, 2, and 3 all differ from the direction of arrival $\theta_a$ of the preceding signal and all differ from each other. The false signal generator 107 also calculates the channel information vector $Vs_i$ of each of the generated false signals using expression (9) and outputs the calculated results to the weight generator 108.

The weight generator 108 uses expressions (10), (11), and (12) to generate a plurality of weights $W_{opt,i}$. Each of the weights $W_{opt,i}$ is associated with a corresponding false signal i of the false signals and each of the weights $W_{opt,i}$ forms a null in the direction of arrival $\theta_a$ of the preceding signal. The weight generator 108 outputs the generated weights $W_{opt,i}$ to the weight multiplier 109 and the subsequent signal channel estimator 111.

The weight multiplier 109 multiplies the received signal recorded in each of the received signal recorders 104-1, 104-2, and 104-3 by the weight $W_{opt,i}$ using expression (13) and outputs the weight-multiplied signals to the subsequent signal determiner 110.

The subsequent signal determiner 110 calculates the preamble correlation values $k_i$ of the weight-multiplied signals for each of the false signals using expression (14) and outputs the calculated preamble correlation values $k_i$ to the subsequent signal channel estimator 111. The subsequent signal determiner 110 determines whether the received signal includes a subsequent signal and outputs the determination result to the subsequent signal channel estimator 111, the separator 112, and the decoder 113. For example, if all of the preamble correlation values $k_i$ are smaller than a threshold, the subsequent signal determiner 110 determines that the received signal does not include any subsequent signal. If any of the preamble correlation values $k_i$ is equal to or greater than the threshold, the subsequent signal determiner 110 determines that the received signal includes a subsequent signal.

When the received signal includes a subsequent signal, the subsequent signal channel estimator 111 estimates the channel information $h_2$ of the subsequent signal using expressions (15), (16), and (17) and outputs the estimated channel information $h_2$ to the separator 112 and the decoder 113.

The separator 112 separates the received signal into the preceding signal and the subsequent signal using the received signals recorded in the received signal recorders 104-1, 104-2, and 104-3, the channel information $h_1$ of the preceding signal, and the channel information $h_2$ of the subsequent signal, and using, for example, expressions (18) and (19). The separator 112 outputs the separated preceding signal and subsequent signal to the decoder 113.

When the received signal does not include any subsequent signal, the decoder 113 demodulates the received signals recorded in the received signal recorders 104-1, 104-2, and 104-3 (specifically, the preceding signals) using the channel information $h_1$ of the preceding signal. The decoder 113 then decodes the demodulated preceding signal.

When the received signal includes a subsequent signal, the decoder 113 demodulates the preceding signal input from the separator 112 using the channel information $h_1$ of the preceding signal. The decoder 113 further demodulates the subsequent signal input from the separator 112 using the channel information $h_2$ of the subsequent signal. The decoder 113 then decodes the demodulated preceding signal and subsequent signal.

Processing Performed at Access Point

Figure 7:
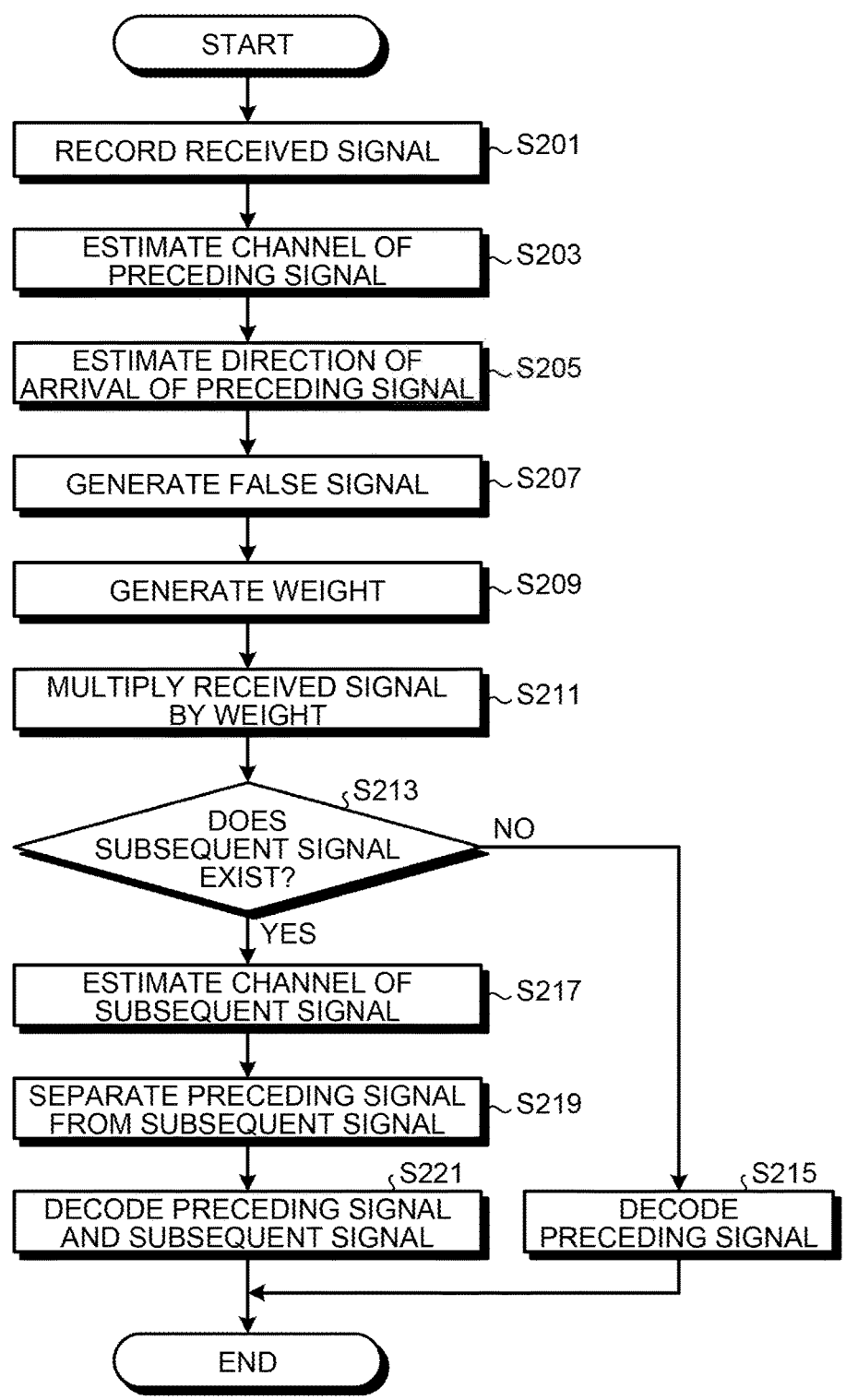
FIG. 7 is a flowchart for illustrating processing performed at the access point according to the first embodiment.

FIG. 7 is a flowchart for illustrating processing performed at the access point according to the first embodiment. The flowchart illustrated in FIG. 7 is performed for the received signal having an RSSI value equal to or greater than the threshold Th at the AP 20.

In FIG. 7, the AP 20 records the received signal having an RSSI value equal to or greater than the threshold Th for each antenna element (Step S201).

The AP 20 calculates the preamble correlation value $K_1$ of the preceding signal using the received signal recorded for each antenna element and using expression (2), to thereby estimate the channel information $h_1$ of the preceding signal (Step S203).

The AP 20 estimates the direction of arrival $\theta_a$ of the preceding signal using expression (8) (Step S205).

The AP 20 generates the false signals that are equal in number to or greater in number than the number of antenna elements Nr and calculates the channel information vector $Vs_i$ of each of the generated false signals using expression (9) (Step S207).

The AP 20 uses expressions (10), (11), and (12) to generate a plurality of weights $W_{opt,i}$. Each of the weights $W_{opt,i}$ is associated with a corresponding false signal i of the false signals and each of the weights $W_{opt,i}$ forms a null in the direction of arrival $\theta_a$ of the preceding signal (Step S209).

The AP 20 multiplies the received signal recorded for each of the antenna elements by the weight $W_{opt,i}$ using expression (13) (Step S211).

The AP 20 determines whether the received signal includes a subsequent signal, specifically, whether a subsequent signal exists (Step S213).

If the subsequent signal does not exist (No at Step S213), the AP 20 demodulates the received signal recorded for each antenna element (specifically, the preceding signal) using the channel information $h_1$ of the preceding signal and decodes the demodulated signal (Step S215).

If the subsequent signal exists (Yes at Step S213), the AP 20 estimates the channel information $h_2$ of the subsequent signal using expressions (15), (16), and (17) (Step S217).

The AP 20 separates the received signal into the preceding signal and the subsequent signal using the received signal recorded for each antenna element, the channel information $h_1$ of the preceding signal, and the channel information $h_2$ of the subsequent signal, and using, for example, expressions (18) and (19) (Step S219).

The AP 20 demodulates the separated preceding signal using the channel information $h_1$ of the preceding signal and demodulates the separated subsequent signal using the channel information $h_2$ of the subsequent signal. The AP 20 then decodes the demodulated preceding signal and subsequent signal (Step S221).

As described above, in the first embodiment, the AP 20 includes the antenna elements A1, A2, and A3, the preceding signal channel estimator 105, the false signal generator 107, the weight generator 108, the weight multiplier 109, and the subsequent signal channel estimator 111. The antenna elements A1, A2, and A3 each receive the received signal that includes a preceding signal and a subsequent signal that collides with the preceding signal. The preceding signal channel estimator 105 estimates the channel information of the preceding signal. The false signal generator 107 generates a plurality of false signals that are equal in number to or greater in number than the number of the antenna elements. Each of the false signals arrives from a unique direction different from the direction of arrival of the preceding signal and different from directions of arrival of other false signals. The weight generator 108 generates a plurality of weights. Each of the weights is associated with a corresponding false signal of the generated false signals and forms a null in the direction of arrival of the preceding signal. The weight multiplier 109 multiplies the received signal received by each of the antenna elements A1, A2, and A3 by the corresponding generated weight to thereby acquire the weight-multiplied signal. The subsequent signal channel estimator 111 estimates the channel information of the subsequent signal using the weight-multiplied signal.

In the first embodiment, the weights are generated so as to be associated with each of the false signals that are equal in number or greater in number than the number of the antenna elements. This arrangement results in pieces of channel information of the subsequent signal existing in number equal to the number of the antenna elements. Meanwhile, the arrangement allows simultaneous equations including a plurality of equations that are equal in number to or greater in number than the number of antenna elements to be derived using the number of weights equal to or greater than the number of antenna elements with respect to the channel information of the subsequent signal. Thus, solving the simultaneous equations allows the channel information of the subsequent signal to be uniquely determined. The received signal can thus be separated into the preceding signal and the subsequent signal using the channel information of the preceding signal and the channel information of the subsequent signal. Since the generated weights form nulls in the direction of arrival of the preceding signal, the multiplication of the received signal by the weight causes the preceding signal to be removed from the received signal, so that the accuracy in estimating the channel information of the subsequent signal can be enhanced. Specifically, the first embodiment enables a plurality of signals that collide with each other to be separated from each other, while enhancing the accuracy in estimating the channel information. This effect can improve throughput and prevent retransmission of a signal from a node to achieve power saving of the node.

[b] Second Embodiment

As in the first embodiment, if the directions of arrival of the false signals are random and different from the direction of arrival of the preceding signal, multiplication of the received signals by the weights generated using the false signals may result in insufficient gain of the direction of arrival of the subsequent signal. Thus, the first embodiment may entail degraded accuracy in estimating the channel information of the subsequent signal. In a second embodiment, the channel information of the subsequent signal is estimated as described below.

Figure 8:
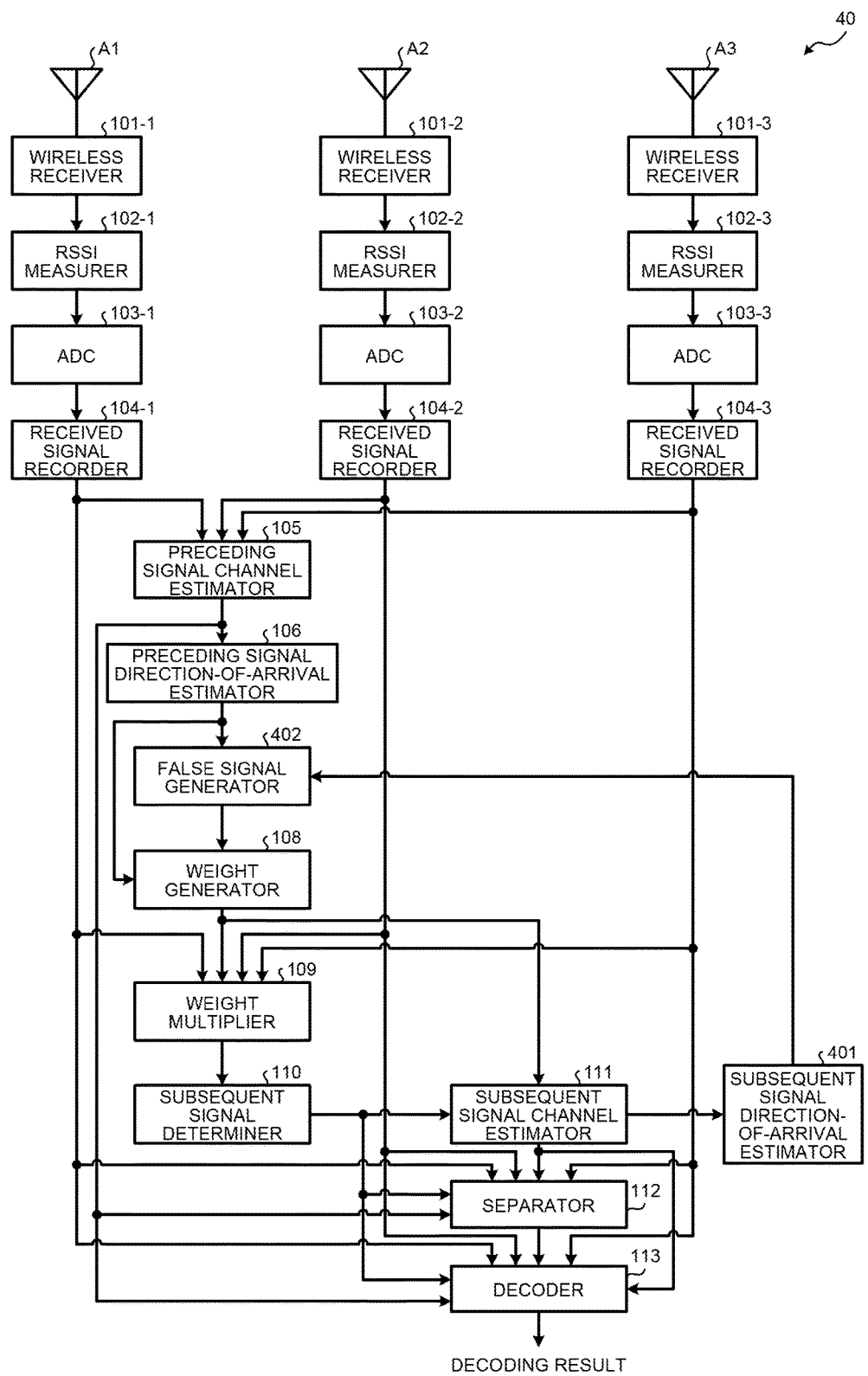
FIG. 8 is an example functional block diagram of a configuration of an access point according to a second embodiment.

FIG. 8 is an example functional block diagram of a configuration of an access point according to the second embodiment. In FIG. 8, an AP 40 includes a subsequent signal direction-of-arrival estimator 401 and a false signal generator 402.

The subsequent signal channel estimator 111 outputs estimated channel information $h_2$ to the separator 112, the decoder 113, and the subsequent signal direction-of-arrival estimator 401.

The subsequent signal direction-of-arrival estimator 401 estimates a direction of arrival $\theta_b$ of the subsequent signal using expression (20) and outputs the estimated direction of arrival $\theta_b$ to the false signal generator 402. In expression (20), d denotes a distance between two adjacent antenna elements and $\theta_{dif2}$ denotes a phase difference of the channel information $h_2$ between the two adjacent antenna elements.

$$\theta_b = \sin^{-1}\left(\frac{\lambda d \theta_{dif2}}{2\pi}\right) \quad (20)$$

The false signal generator 402 performs the following processing in addition to the processing performed by the false signal generator 107 of the first embodiment. Specifically, the false signal generator 402, after having generated the false signals as in the first embodiment, generates false signals using the direction of arrival $\theta_b$ estimated by the subsequent signal channel estimator 111. The false signal generator 402 sets the direction of arrival $\theta_{s,i}$ of the false signals using expression (21). In expression (21), $\alpha_i$ is preferably set, for example, in the range of "0°≤$\alpha_i$<20°". Specifically, the false signal generator 402, after having generated the false signals as in the first embodiment, generates a plurality of false signals that are equal in number to or greater in number than the number of the antenna elements and that arrive from directions that fall within a predetermined range with respect to the direction of arrival of the subsequent signal. The weight generator 108 generates weights using expressions (10), (11), and (12), as in the first embodiment.

$$\theta_{s,i} = \theta_b + \alpha_i \quad (21)$$

Repeated performance of the above-described processing by the subsequent signal direction-of-arrival estimator 401 and the false signal generator 402 and repeated generation of weights by the weight generator 108 allow gain of the direction of arrival of the subsequent signal to be gradually increased. The second embodiment thus can enhance the accuracy in estimating the channel information of the subsequent signal.

[c] Third Embodiment

In a third embodiment described hereunder, the accuracy in estimating the channel information of the subsequent signal is enhanced through processing that is different from the processing performed in the second embodiment.

Figure 9:
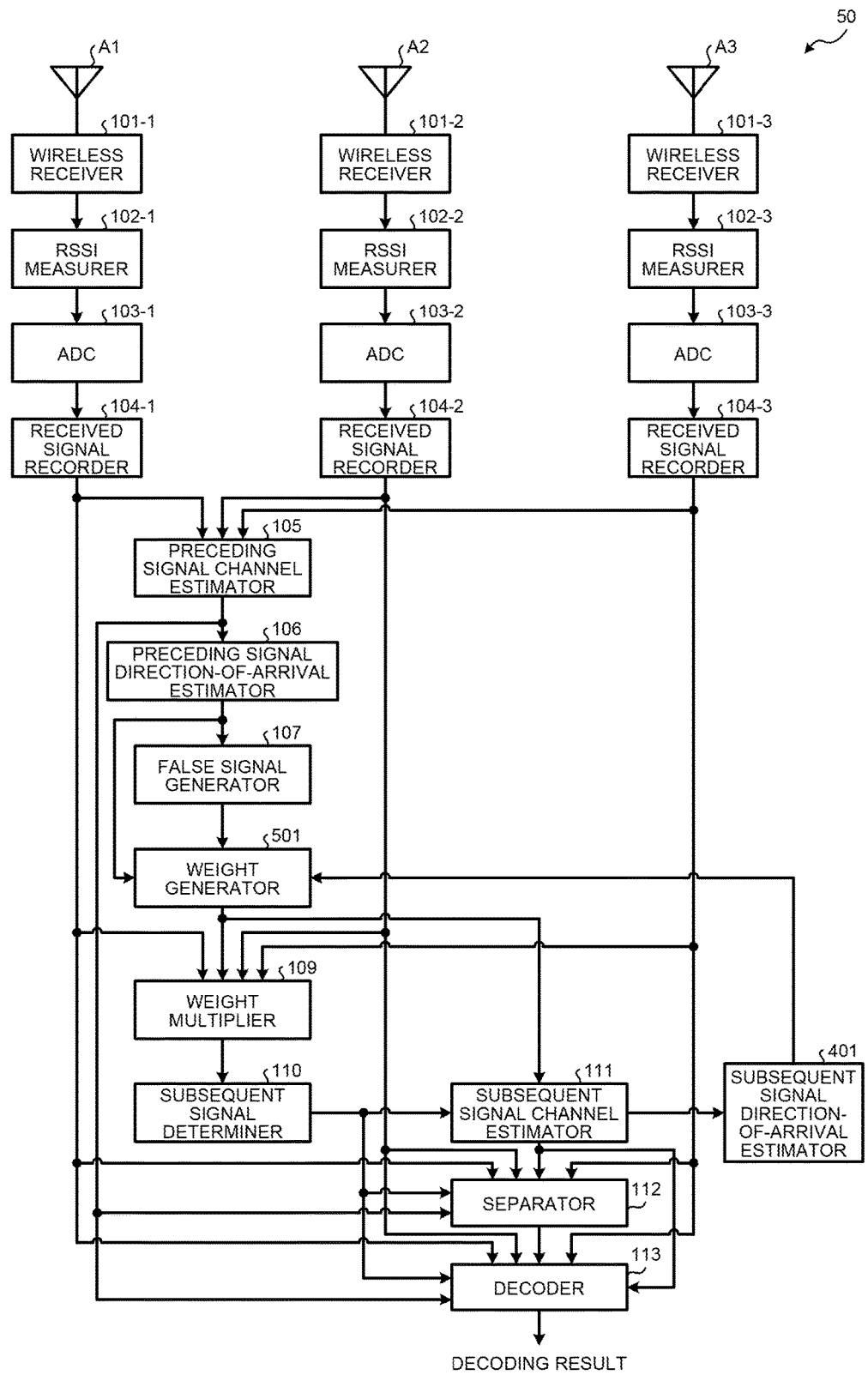
FIG. 9 is an example functional block diagram of a configuration of an access point according to a third embodiment.

FIG. 9 is an example functional block diagram of a configuration of an access point according to the third embodiment. In FIG. 9, an AP 50 includes a weight generator 501.

The subsequent signal direction-of-arrival estimator 401 estimates the direction of arrival $\theta_b$ of the subsequent signal using expression (20) and outputs the estimated direction of arrival $\theta_b$ to the weight generator 501.

The weight generator 501 performs the following processing in addition to the processing performed by the weight generator 108 of the first embodiment. Specifically, the weight generator 501, after having generated the weights as in the first embodiment, generates a plurality of weights $W_{opt,i}$. Each of the weights $W_{opt,i}$ is associated with a corresponding false signal i of the false signals, forms a null in the direction of arrival of the preceding signal, and forms a beam in the direction of arrival of the subsequent signal.

The weight generator 501 generates the weights $W_{opt,i}$ using, for example, the directional constrained minimization of power (DCMP) algorithm. The following describes differences from the Wiener solution employed in the first embodiment.

Specifically, the third embodiment uses a constraint matrix $C_i$ and a constraint response vector H in generating the weights $W_{opt,i}$. The constraint matrix $C_i$ depicted in expression (22) includes only the phase information of the channel information (Nr×1 vector) of each of the false signal, the preceding signal, and the subsequent signal. The constraint response vector H depicted in expression (23) takes, with respect to each of the elements of the constraint matrix $C_i$, "0" when forming the null and "1" when forming the beam. Specifically, the constraint response vector H depicted in expression (23) signifies that a beam or a null is formed for the false signal, a null is formed for the preceding signal, and a beam is formed for the subsequent signal.

$$c_i = \left[vs_i, \frac{h_1}{|h_1|}, \frac{h_2}{|h_1|}\right] \quad (22)$$

$$H = [1, 0, 1] \text{ or } [0, 0, 1] \quad (23)$$

The weight generator 501 generates the weights $W_{opt,i}$ using the constraint matrix $C_i$ depicted in expression (22), the constraint response vector H depicted in expression (23), and the correlation matrix $Rxx_i$ depicted in expression (12) and using expression (24).

$$W_{opt,i} = -\text{inv}(Rxx_i)C_i\{-\text{inv}(C_i^H Rxx_i C_i)H^*\} \quad (24)$$

The subsequent steps are the same as the steps described in the first embodiment.

Repeated performance of the above-described processing by the subsequent signal direction-of-arrival estimator 401 and the weight generator 501 to thereby repeatedly generate weights allows gain of the direction of arrival of the subsequent signal to be gradually increased. The third embodiment can thus enhance the accuracy in estimating the channel information of the subsequent signal.

[d] Fourth Embodiment

In a fourth embodiment described hereunder, the accuracy in estimating the channel information of the subsequent signal is enhanced through processing that is different from processing employed in the second and third embodiments.

Figure 10:
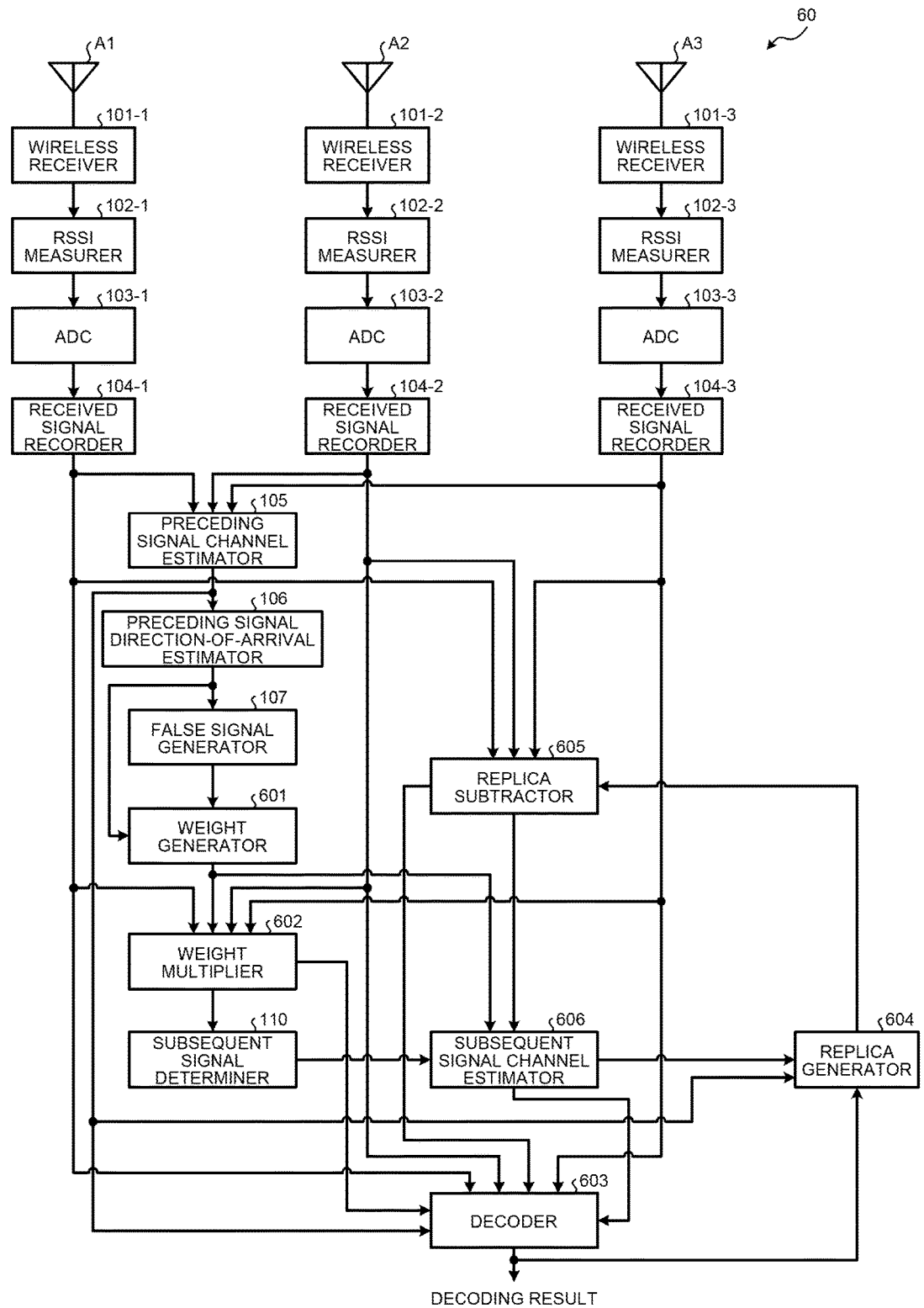
FIG. 10 is an example functional block diagram of a configuration of an access point according to a fourth embodiment.

FIG. 10 is an example functional block diagram of a configuration of an access point according to the fourth embodiment. In FIG. 10, an AP 60 includes a weight generator 601, a weight multiplier 602, a decoder 603, a replica generator 604, a replica subtractor 605, and a subsequent signal channel estimator 606. The weight generator 601, the weight multiplier 602, the decoder 603, and the subsequent signal channel estimator 606 perform the processing described below, in addition to the processing performed by the weight generator 108, the weight multiplier 109, the decoder 113, and the subsequent signal channel estimator 111 of the first embodiment. The AP 60 performs the processing described below after having estimated the channel information $h_1$ of the preceding signal and the channel information $h_2$ of the subsequent signal as in the first embodiment. The following describes the processing performed by the AP 60 in the fourth embodiment in chronological order in order of Step 1 through Step 8.

Step 1

The direction of arrival $\theta_a$ of the preceding signal estimated by the preceding signal direction-of-arrival estimator 106 is input to the weight generator 601. The weight generator 601 uses the Wiener solution to generate the weight $W_1$ (1×Nr vector) that forms a null in the direction of arrival $\theta_a$ of the preceding signal and outputs the generated weight $W_1$ to the weight multiplier 602.

The weight multiplier 602 multiplies each of the received signals recorded in each of the received signal recorders 104-1, 104-2, and 104-3 by the weight $W_1$ using expression (25) and outputs the weight-multiplied signals to the decoder 603.

$$W_1 y(t) = W_1(h_1 S_1(t) + h_2 S_2(t) + n(t)) \approx W_1(h_2 S_2(t) + n(t)) \quad (25)$$

The weight $W_1$ forms a null in the direction of arrival of the preceding signal, so that the weight-multiplied signal depicted in expression (25) corresponds to the received signal including the preceding signal and the subsequent signal, from which the preceding signal is removed, specifically, the subsequent signal. The decoder 603 then demodulates the weight-multiplied signal depicted in expression (25) using the channel information $h_2$ of the subsequent signal and decodes the demodulated subsequent signal. The decoder 603 outputs the decoding result of the subsequent signal to the replica generator 604.

The subsequent signal channel estimator 606 outputs the channel information $h_2$ of the subsequent signal estimated in the first embodiment to the replica generator 604.

Step 2

The replica generator 604 encodes and modulates the decoding result of the subsequent signal to acquire a modulation signal $S_2\hat{}(t)$. The replica generator 604 multiplies the modulation signal $S_2\hat{}(t)$ by the channel information $h_2$ to thereby generate a replica $h_2 S_2\hat{}(t)$ of the subsequent signal. The replica generator 604 outputs the generated replica $h_2 S_2\hat{}(t)$ to the replica subtractor 605.

Step 3

The replica subtractor 605 subtracts the replica $h_2 S_2\hat{}(t)$ from the received signals recorded in the received signal recorders 104-1, 104-2, and 104-3 using expression (26) and outputs the replica-subtracted signals to the decoder 603.

$$y(t) - h_2 \hat{S}_2(t) = h_1 S_1(t) + h_2 S_2(t) + n(t) - h_2 \hat{S}_2(t) \approx h_1 S_1(t) + n(t) \quad (26)$$

Step 4 Because a preceding signal component is left in the replica-subtracted signal depicted in expression (26), the decoder 603 demodulates the replica-subtracted signal depicted in expression (26) using the channel information $h_1$ of the preceding signal estimated by the preceding signal channel estimator 105 and decodes the demodulated preceding signal. The decoder 603 outputs the decoding result of the preceding signal to the replica generator 604.

Step 5

The replica generator 604 encodes and modulates the decoding result of the preceding signal to acquire a modulation signal $S_1\hat{}(t)$. The replica generator 604 multiplies the modulation signal $S_1\hat{}(t)$ by the channel information $h_1$ of the preceding signal estimated by the preceding signal channel estimator 105 to thereby generate a replica $h_1 S_1\hat{}(t)$ of the preceding signal. The replica generator 604 outputs the generated replica $h_1 S_1\hat{}(t)$ to the replica subtractor 605.

Step 6

The replica subtractor 605 subtracts the replica $h_1 S_1\hat{}(t)$ from the received signals recorded in the received signal recorders 104-1, 104-2, and 104-3 using expression (27) and outputs the replica-subtracted signals to the subsequent signal channel estimator 606 and the decoder 603.

$$y(t) - h_1 \hat{S}_1(t) = h_1 S_1(t) + h_2 S_2(t) + n(t) - h_1 \hat{S}_1(t) \approx h_2 S_2(t) + n(t) \quad (27)$$

Step 7

The subsequent signal channel estimator 606 calculates the preamble correlation value using the replica-subtracted signal depicted in expression (27) and using expression (28), to thereby estimate the channel information $h_2\hat{}$ of the subsequent signal. The subsequent signal channel estimator 606 outputs the estimated channel information $h_2\hat{}$ to the decoder 603.

$$K = \frac{1}{N} \sum_{t=0}^{N-1} (y(t) - h_1 \hat{S}_1(t)) S_2^*(t) \quad (28)$$

$$\approx \frac{1}{N} \sum_{t=0}^{N-1} (h_2 S_2(t) + n(t)) S_2^*(t)$$

$$\approx \hat{h}_2$$

Step 8

Because a subsequent signal component is left in the replica-subtracted signal depicted in expression (27), the decoder 603 demodulates the replica-subtracted signal depicted in expression (27) using the channel information $h_2\hat{}$ of the subsequent signal estimated at Step 7 and decodes the demodulated subsequent signal. The decoder 603 outputs the decoding result of the subsequent signal to the replica generator 604.

The processing, after completing Step 8, returns to Step 2 and repeatedly performs steps from Step 2 to Step 8. Preferably, the steps from Step 2 to Step 8 are repeatedly performed until no errors are detected by the CRC in both the decoding result of the preceding signal and the decoding result of the subsequent signal. In the repeated performance of the steps, however, the channel information $h_2\hat{}$ estimated at Step 7 is used instead of the channel information $h_2$ estimated in the first embodiment.

The repeated performance of the steps from Step 2 to Step 8 allows the received signal to be separated into the preceding signal and the subsequent signal, while enhancing the accuracy in estimating the channel information of the subsequent signal.

[e] Fifth Embodiment

Figure 11:
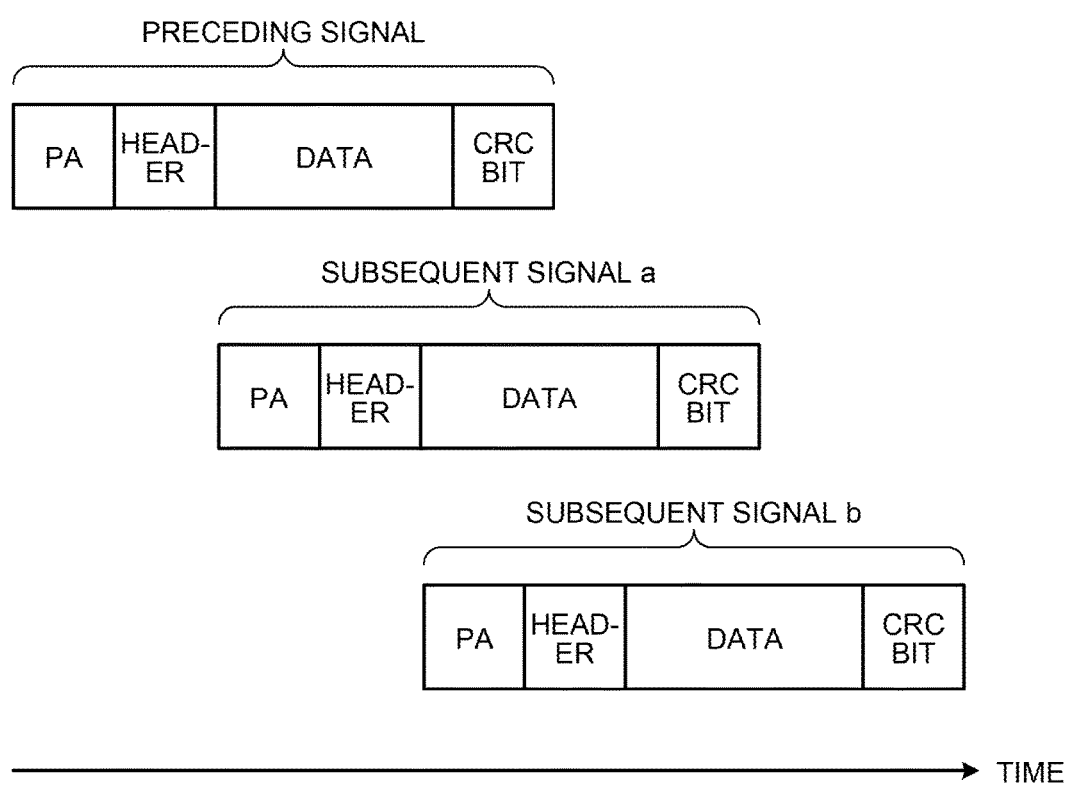
FIG. 11 is an example diagram of a collision between a preceding signal and subsequent signals according to a fifth embodiment.

In a fifth embodiment described hereunder, the received signal includes a preceding signal, a subsequent signal a that collides with the preceding signal, and a subsequent signal b that collides with both the preceding signal and the subsequent signal a. Specifically, as illustrated in FIG. 11, while the preceding signal arrives at the access point, the subsequent signal a arrives at the access point following the preceding signal and the subsequent signal b arrives at the access point following the subsequent signal a, so that collisions between respective pairs of the signals occur at the access point. FIG. 11 is an example diagram of a collision between the preceding signal and the subsequent signals according to the fifth embodiment. The preceding signal, the subsequent signal a, and the subsequent signal b each have a packet format illustrated in FIG. 11, for example, and include a preamble (PA), a header, data, and a CRC bit. Assume that the subsequent signal a arrives with a delay of a preamble length or more from the start of the preceding signal and the subsequent signal b arrives with a delay of the preamble length or more from the start of the subsequent signal a. Specifically, the preamble of the preceding signal does not overlap the subsequent signal a or the subsequent signal b. The preamble of the subsequent signal a overlaps the preceding signal, but not the subsequent signal b. The preamble of the subsequent signal b overlaps both the preceding signal and the subsequent signal a.

Let $S_1(t)$ be the preceding signal illustrated in FIG. 11 and $h_1$ be the channel information of the preceding signal. Let $S_2(t)$ be the subsequent signal a illustrated in FIG. 11 and $h_2$ be the channel information of the subsequent signal a. Let $S_3(t)$ be the subsequent signal b illustrated in FIG. 11 and $h_3$ be the channel information of the subsequent signal b.

The preceding signal illustrated in FIG. 11 corresponds to the preceding signal illustrated in FIG. 1 and the subsequent signal a illustrated in FIG. 11 corresponds to the subsequent signal illustrated in FIG. 1. Thus, the received signal y(t) at the access point at the preamble portion of the preceding signal is expressed by expression (1) and the received signal y(t) at the access point at the preamble portion of the subsequent signal a is expressed by expression (3).

Similarly, the received signal y(t) at the access point at the preamble portion of the subsequent signal b is expressed by expression (29).

$$y(t)=h_1S_1(t)+h_2S_2(t)+h_3S_3(t)+n(t) \tag{29}$$

The access point in the fifth embodiment has a configuration similar to the configuration of the access point in the third embodiment. The following description refers to FIG. 9.

As in the first embodiment, the AP 50 estimates the channel information $h_1$ of the preceding signal and the channel information $h_2$ of the subsequent signal a before performing the processing described below.

The subsequent signal direction-of-arrival estimator 401 estimates the direction of arrival $\theta_b$ of the subsequent signal a using expression (20) and outputs the estimated direction of arrival $\theta_b$ to the weight generator 501.

The weight generator 501 performs the following processing in addition to the processing performed by the weight generator 108 of the first embodiment. Specifically, the weight generator 501, after having generated the weights as in the first embodiment, generates a plurality of weights $W_{opt,i}$. Each of the weights $W_{opt,i}$ is associated with a corresponding false signal i of the false signals and each of the weights $W_{opt,i}$ forms a null in the direction of arrival of the preceding signal and the direction of arrival of the subsequent signal a.

The weight generator 501 generates the weights $W_{opt,i}$ using, for example, the DCMP algorithm. The following describes differences from the Wiener solution employed in the first embodiment.

Specifically, the fifth embodiment uses the constraint matrix $C_i$ depicted in expression (22) and the constraint response vector H depicted in expression (30) in generating the weights $W_{opt,i}$. The constraint response vector H depicted in expression (30) takes, with respect to each of the elements of the constraint matrix $C_i$, "0" when forming the null and "1" when forming the beam. Specifically, the constraint response vector H depicted in expression (30) signifies that a beam or a null is formed for the false signal and a null is formed for the preceding signal and the subsequent signal a.

$$H=[1,0,0] \text{ or } [0,0,0] \tag{30}$$

The weight generator 501 generates the weights $W_{opt,i}$ using the constraint matrix $C_i$ depicted in expression (22), the constraint response vector H depicted in expression (30), and the correlation matrix $Rxx_i$ depicted in expression (12) and using expression (24).

The subsequent steps are the same as the steps performed for the subsequent signal in the first embodiment.

The fifth embodiment thus allows the received signal to be separated into the preceding signal, the subsequent signal a, and the subsequent signal b.

[f] Sixth Embodiment

In a sixth embodiment described hereunder, the received signal is separated into the preceding signal, the subsequent signal a, and the subsequent signal b through processing different from the processing performed in the fifth embodiment.

Figure 12:
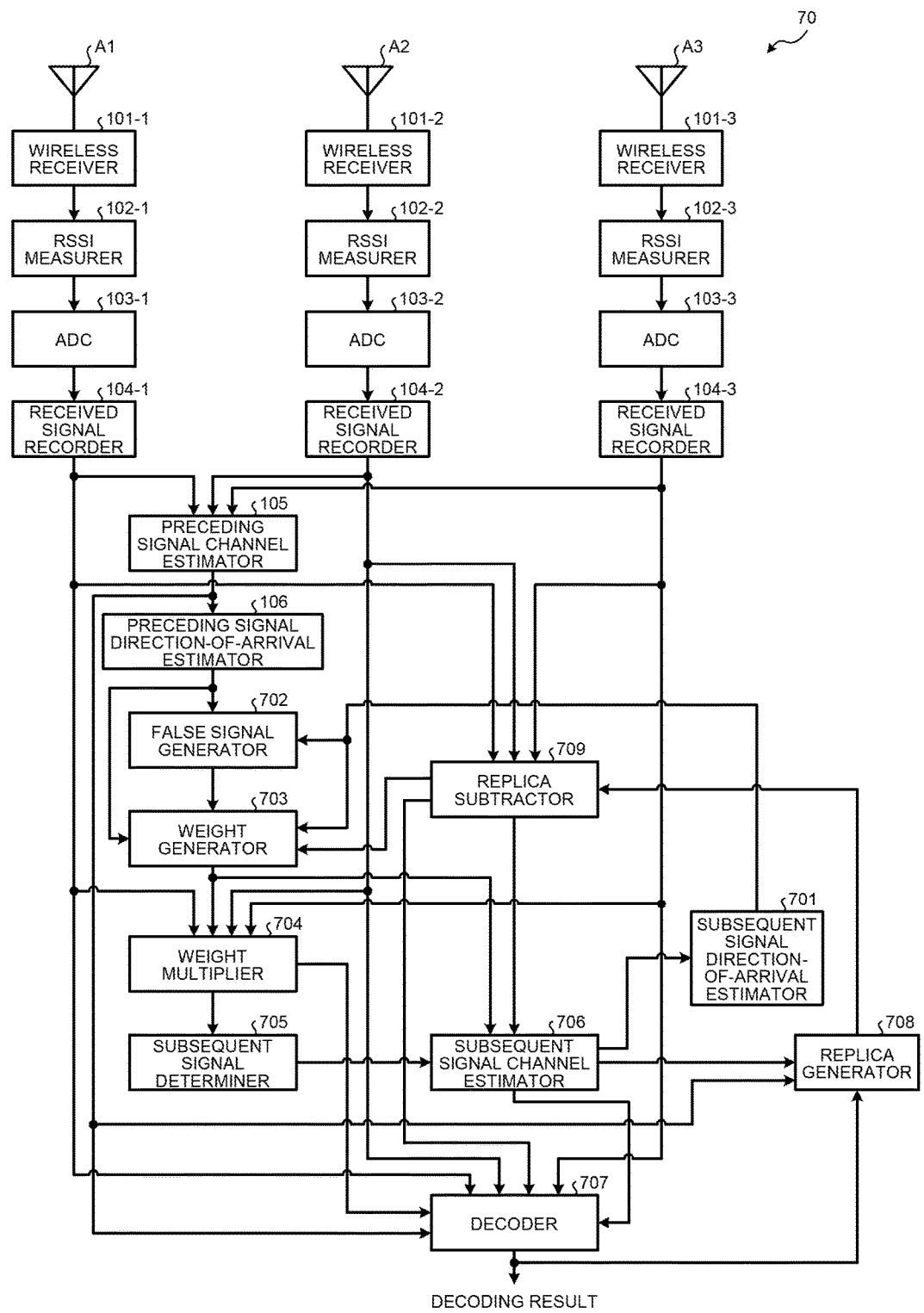
FIG. 12 is an example functional block diagram of a configuration of an access point according to a sixth embodiment.

FIG. 12 is an example functional block diagram of a configuration of an access point according to the sixth embodiment. In FIG. 12, an AP 70 includes a subsequent signal direction-of-arrival estimator 701, a false signal generator 702, a weight generator 703, a weight multiplier 704, a subsequent signal determiner 705, a subsequent signal channel estimator 706, a decoder 707, a replica generator 708, and a replica subtractor 709. The false signal generator 702, the weight generator 703, the weight multiplier 704, the subsequent signal determiner 705, the subsequent signal channel estimator 706, and the decoder 707 perform the processing described below, in addition to the processing performed by the false signal generator 107, the weight generator 108, the weight multiplier 109, the subsequent signal determiner 705, the subsequent signal channel estimator 111, and the decoder 113 of the first embodiment. The AP 70 performs the processing described below after having estimated the channel information $h_1$ of the preceding signal and the channel information $h_2$ of the subsequent signal a as in the first embodiment. The following describes the processing performed by the AP 70 in the sixth embodiment in chronological order in order of Step 1 through Step 24.

Step 1

The subsequent signal channel estimator 706 outputs the estimated channel information $h_2$ to the subsequent signal direction-of-arrival estimator 701, the decoder 707, and the replica generator 708.

The subsequent signal direction-of-arrival estimator 701 estimates the direction of arrival $\theta_b$ of the subsequent signal a using expression (20) and outputs the estimated direction of arrival $\theta_b$ to the false signal generator 702 and the weight generator 703.

Step 2

The false signal generator 702 performs the following processing in addition to the processing performed by the false signal generator 107 of the first embodiment. Specifically, the false signal generator 702, after having generated the false signals as in the first embodiment, further generates false signals that are equal in number to or greater in number than the number of antenna elements Nr. Since the AP 70 includes three antenna elements A1, A2, and A3, the false signal generator 702 generates, for example, three false signals 1, 2, and 3 that are equal in number to the number of antenna elements. Specifically, i=1, 2, and 3. The directions of arrival of the three false signals 1, 2, and 3 all differ from the direction of arrival $\theta_a$ of the preceding signal and the direction of arrival $\theta_b$ of the subsequent signal a, and all differ from each other. The false signal generator 702 also calculates the channel information vector $Vs_i$ of each of the generated false signals using expression (9) and outputs the calculated results to the weight generator 703.

Step 3

The weight generator 703 performs the following processing in addition to the processing performed by the weight generator 108 of the first embodiment. Specifically, as in the first embodiment, the weight generator 703 uses expressions (10), (11), and (12) to generate a plurality of weights $W_{2opt,i}$. Each of the weights $W_{2opt,i}$ is associated with a corresponding false signal i of the false signals and each of the weights $W_{2opt,i}$ forms a null in the direction of arrival $\theta_a$ of the preceding signal and in the direction of arrival $\theta_b$ of the subsequent signal a. The weight generator 703 outputs the generated weights $W_{2opt,i}$ to the weight multiplier 704 and the subsequent signal channel estimator 706.

Step 4

The weight multiplier 704 performs the following processing in addition to the processing performed by the weight multiplier 109 of the first embodiment.

Specifically, the weight multiplier 704 multiplies the received signal (expression (29)) recorded in each of the received signal recorders 104-1, 104-2, and 104-3 by the weight $W_{2opt,i}$ and outputs weight-multiplied signals $W_{2opt,i}y(t)$ to the subsequent signal determiner 705.

Step 5

The subsequent signal determiner 705 performs the following processing in addition to the processing performed by the subsequent signal determiner 110 of the first embodiment. Specifically, the subsequent signal determiner 705 calculates the preamble correlation values $k_{2i}$ of the weight-multiplied signals $W_{2opt,i}y(t)$ for each of the false signals using expression (31). The weight-multiplied signal $W_{2opt,i}y(t)$ corresponds to the received signal including the preceding signal, the subsequent signal a, and the subsequent signal b, from which the preceding signal and the subsequent signal a are removed, specifically, the subsequent signal b. Thus, the preamble correlation value $k_{2i}$ calculated using expression (31) corresponds to the preamble correlation value of the subsequent signal b. The subsequent signal determiner 705 outputs the calculated preamble correlation values $k_{2i}$ to the subsequent signal channel estimator 706.

$$k_{2i} = \frac{1}{N}\sum_{t=0}^{N-1} w_{2opt,i} y(t) S_3^*(t) \quad (31)$$
$$\approx w_{2opt,i} h_3$$

Step 6

The subsequent signal channel estimator 706 performs the following processing in addition to the processing performed by the subsequent signal channel estimator 111 of the first embodiment. Specifically, the subsequent signal channel estimator 706 establishes simultaneous equations as depicted in expression (32) on the basis of the preamble correlation values $k_{2i}$ ($k_{21}$, $k_{22}$, ..., $k_{2Ng}$) calculated using expression (31).

$$[k_{21}, \ldots, k_{2Ng}]^T = [W_{2opt,1}^T, \ldots, W_{2opt,Ng}^T]^T h_3 \quad (32)$$

The subsequent signal channel estimator 706 estimates the channel information $h_3$ (Nr×1 vector, $[h_{31}, h_{32}, \ldots, h_{3Nr}]^T$) of the subsequent signal b using expression (33) in which expression (32) is solved for $h_3$. Specifically, the subsequent signal channel estimator 706 solves the simultaneous equations depicted in expression (33) to thereby estimate the channel information $h_3$ of the subsequent signal b. In expression (33), the superscript "+" denotes a generalization inverse matrix. The generalization inverse matrix is calculated as depicted in expression (34). The subsequent signal channel estimator 706 outputs the estimated channel information $h_3$ to the decoder 707 and the replica generator 708.

$$h_3 = ([W_{2opt,1}^T, \ldots, W_{2opt,Ng}^T]^T)^+ [k_{21}, \ldots, k_{2Ng}]^T \quad (33)$$

$$([W_{2opt,1}^T, \ldots, W_{2opt,Ng}^T]^T)^+ = \\ (([W_{2opt,1}^T, \ldots, W_{2opt,Ng}^T]^T)^H \\ ([W_{2opt,1}^T, \ldots, W_{2opt,Ng}^T]^T))^{-1} \\ ([W_{2opt,1}^T, \ldots, W_{2opt,Ng}^T]^T)^H \quad (34)$$

Step 7

The direction of arrival $\theta_a$ of the preceding signal estimated by the preceding signal direction-of-arrival estimator 106 is input to the weight generator 703. The direction of arrival $\theta_b$ of the subsequent signal a estimated by the subsequent signal direction-of-arrival estimator 701 is input to the weight generator 703. The weight generator 703 uses the Wiener solution to generate the weight $W_2$ (1×Nr vector) that forms a null in the direction of arrival $\theta_a$ of the preceding signal and the direction of arrival $\theta_b$ of the subsequent signal a and outputs the generated weight $W_2$ to the weight multiplier 704.

The weight multiplier 704 multiplies the received signal recorded in each of the received signal recorders 104-1, 104-2, and 104-3 by the weight $W_2$ using expression (35) and outputs the weight-multiplied signals to the decoder 707.

$$W_2 y(t) = W_2(h_1 S_1(t) + h_2 S_2(t) + h_3 S_3(t) + n(t)) \approx W_2(h_3 S_3(t) + n(t)) \quad (35)$$

The weight $W_2$ forms a null in the direction of arrival of the preceding signal and the direction of arrival of the subsequent signal a, so that the weight-multiplied signal depicted in expression (35) corresponds to the received signal including the preceding signal, the subsequent signal a, and the subsequent signal b, from which the preceding signal and the subsequent signal a are removed, specifically, the subsequent signal b. The decoder 707 then demodulates the weight-multiplied signal depicted in expression (35) using the channel information $h_3$ of the subsequent signal b and decodes the demodulated subsequent signal b. The decoder 707 outputs the decoding result of the subsequent signal b to the replica generator 708.

Step 8

The replica generator 708 encodes and modulates the decoding result of the subsequent signal b to acquire a modulation signal $S_3\hat{}(t)$. The replica generator 708 multiplies the modulation signal $S_3\hat{}(t)$ by the channel information $h_3$ to thereby generate a replica $h_3 S_3\hat{}(t)$ of the subsequent signal b. The replica generator 708 outputs the generated replica $h_3 \hat{S}_3(t)$ to the replica subtractor 709.

Step 9

The replica subtractor 709 subtracts the replica $h_3 \hat{S}_3(t)$ from the received signals recorded in the received signal recorders 104-1, 104-2, and 104-3 using expression (36) and outputs the replica-subtracted signals to the weight generator 703.

$$y(t) - h_3 \hat{S}_3(t) = h_1 S_1(t) + h_2 S_2(t) + h_3 S_3(t) + n(t) - h_3 \hat{S}_3(t) \approx h_1 S_1(t) + h_2 S_2(t) + n(t) \quad (36)$$

Step 10

The weight generator 703 uses the Wiener solution to generate the weight $W_1$ (1×Nr vector) that forms a null in the direction of arrival $\theta_a$ of the preceding signal and outputs the generated weight $W_1$ to the weight multiplier 704.

The weight multiplier 704 multiplies the replica-subtracted signal depicted in expression (36) by the weight $W_1$ using expression (37) and outputs the weight-multiplied signal to the decoder 707.

$$W_1(h_1 S_1(t) + h_2 S_2(t) + n(t)) \approx W_1(h_2 S_2(t) + n(t)) \quad (37)$$

The weight $W_1$ forms a null in the direction of arrival of the preceding signal, so that the weight-multiplied signal depicted in expression (37) corresponds to the received signal including the preceding signal, the subsequent signal a, and the subsequent signal b, from which the preceding signal and the subsequent signal b are removed, specifically, the subsequent signal a. The decoder 707 then demodulates the weight-multiplied signal depicted in expression (37) using the channel information $h_2$ of the subsequent signal a and decodes the demodulated subsequent signal a. The decoder 707 outputs the decoding result of the subsequent signal a to the replica generator 708.

Step 11

The replica generator 708 receives an input of the channel information $h_2$ of the subsequent signal a from the subsequent signal channel estimator 706. The replica generator 708 encodes and modulates the decoding result of the subsequent signal a to acquire a modulation signal $S_2\hat{}(t)$. The replica generator 708 multiplies the modulation signal $S_2\hat{}(t)$ by the channel information $h_2$ to thereby generate a replica $h_2 S_2\hat{}(t)$ of the subsequent signal a. The replica generator 708 outputs the generated replica $h_2 S_2\hat{}(t)$ to the replica subtractor 709.

Step 12

The replica subtractor 709 subtracts the replica $h_2 S_2\hat{}(t)$ and the replica $h_3 S_3\hat{}(t)$ from the received signals recorded in the received signal recorders 104-1, 104-2, and 104-3 using expression (38) and outputs the replica-subtracted signals to the decoder 707.

$$y(t) - h_2 \hat{S}_2(t) - h_3 \hat{S}_3(t) = h_1 S_1(t) + h_2 S_2(t) + h_3 S_3(t) + n(t) - h_2 \hat{S}_2(t) - h_3 \hat{S}_3(t) \approx h_1 S_1(t) + n(t) \quad (38)$$

Step 13

Because a preceding signal component is left in the replica-subtracted signal depicted in expression (38), the decoder 707 demodulates the replica-subtracted signal depicted in expression (38) using the channel information $h_1$ of the preceding signal estimated by the preceding signal channel estimator 105 and decodes the demodulated preceding signal. The decoder 707 outputs the decoding result of the preceding signal to the replica generator 708.

Step 14

The replica generator 708 encodes and modulates the decoding result of the preceding signal to acquire a modulation signal $S_1\hat{}(t)$. The replica generator 708 multiplies the modulation signal $S_1\hat{}(t)$ by the channel information $h_1$ of the preceding signal estimated by the preceding signal channel estimator 105 to thereby generate a replica $h_1 S_1\hat{}(t)$ of the preceding signal. The replica generator 708 outputs the generated replica $h_1 S_1\hat{}(t)$ to the replica subtractor 709.

Step 15

The replica subtractor 709 subtracts the replica $h_1 S_1\hat{}(t)$ from the received signals recorded in the received signal recorders 104-1, 104-2, and 104-3 using expression (27) and outputs the replica-subtracted signals to the subsequent signal channel estimator 706 and the decoder 707.

Step 16

The subsequent signal channel estimator 706 calculates the preamble correlation value using the replica-subtracted signal depicted in expression (27) and using expression (28), to thereby estimate the channel information $h_2\hat{}$ of the subsequent signal a. The subsequent signal channel estimator 706 outputs the estimated channel information $h_2\hat{}$ to the decoder 707.

It is noted that the preamble correlation value calculated at Step 16 is concerned with the preamble (FIG. 11) of the subsequent signal a, and that the received signal at Step 15 does not include the subsequent signal b.

Step 17

Because a component of the subsequent signal a is left in the replica-subtracted signal depicted in expression (27), the decoder 707 demodulates the replica-subtracted signal depicted in expression (27) using the channel information $h_2\hat{}$ of the subsequent signal a estimated at Step 16 and decodes the demodulated subsequent signal a. The decoder 707 outputs the decoding result of the subsequent signal a to the replica generator 708.

Step 18

The replica generator 708 encodes and modulates the decoding result of the subsequent signal a to acquire a modulation signal $S_2\hat{}(t)$. The replica generator 708 multiplies the modulation signal $S_2\hat{}(t)$ by the channel information $h_2\hat{}$ to thereby generate a replica $h_2\hat{} S_2\hat{}(t)$ of the subsequent signal a. The replica generator 708 outputs the generated replica $h_2\hat{} S_2\hat{}(t)$ to the replica subtractor 709.

Step 19

The replica subtractor 709 subtracts the replica $h_1 S_1\hat{}(t)$ and the replica $h_2\hat{} S_2\hat{}(t)$ from the received signals recorded in the received signal recorders 104-1, 104-2, and 104-3 using expression (39) and outputs the replica-subtracted signals to the subsequent signal channel estimator 706 and the decoder 707.

$$y(t) - h_1 \hat{S}_1(t) - \hat{h}_2 \hat{S}_2(t) = h_1 S_1(t) + h_2 S_2(t) + h_3 S_3(t) + n(t) - h_1 \hat{S}_1(t) - \hat{h}_2 \hat{S}_2(t) \approx h_3 S_3(t) + n(t) \quad (39)$$

Step 20

The subsequent signal channel estimator 706 calculates the preamble correlation value using the replica-subtracted signal depicted in expression (39) and using expression (40), to thereby estimate the channel information $h_3\hat{}$ of the subsequent signal b. The subsequent signal channel estimator 706 outputs the estimated channel information $h_3\hat{}$ to the decoder 707 and the replica generator 708.

$$K = \frac{1}{N} \sum_{t=0}^{N-1} \left( y(t) - h_1 \hat{S}_1(t) - \hat{h}_2 \hat{S}_2(t) \right) S_3^*(t) \quad (40)$$

$$\approx \frac{1}{N} \sum_{t=0}^{N-1} (h_3 S_3(t) + n(t)) S_3^*(t)$$

$$\approx \hat{h}_3$$

Step 21

Because a component of the subsequent signal b is left in the replica-subtracted signal depicted in expression (39), the decoder 707 demodulates the replica-subtracted signal depicted in expression (39) using the channel information $\hat{h}_3$ of the subsequent signal b estimated at Step 20 and decodes the demodulated subsequent signal b. The decoder 707 outputs the decoding result of the subsequent signal b to the replica generator 708.

Step 22

The replica generator 708 encodes and modulates the decoding result of the subsequent signal b to acquire a modulation signal $\hat{S}_3(t)$. The replica generator 708 multiplies the modulation signal $\hat{S}_3(t)$ by the channel information $\hat{h}_3$ to thereby generate a replica $\hat{h}_3 \hat{S}_3(t)$ of the subsequent signal b. The replica generator 708 outputs the generated replica $\hat{h}_3 \hat{S}_3(t)$ to the replica subtractor 709.

Step 23

The replica subtractor 709 subtracts the replica $\hat{h}_2 \hat{S}_2(t)$ and the replica $\hat{h}_3 \hat{S}_3(t)$ from the received signals recorded in the received signal recorders 104-1, 104-2, and 104-3 using expression (41) and outputs the replica-subtracted signals to the subsequent signal channel estimator 706 and the decoder 707.

$$y(t) - \hat{h}_2 \hat{S}_2(t) - \hat{h}_3 \hat{S}_3(t) = h_1 S_1(t) + h_2 S_2(t) + h_3 S_3(t) + n(t) - \hat{h}_2 \hat{S}_2(t) - \hat{h}_3 \hat{S}_3(t) \approx h_1 S_1(t) + n(t) \quad (41)$$

Step 24

Because a preceding signal component is left in the replica-subtracted signal depicted in expression (41), the decoder 707 demodulates the replica-subtracted signal depicted in expression (41) using the channel information $h_1$ of the preceding signal estimated by the preceding signal channel estimator 105 and decodes the demodulated preceding signal. The decoder 707 outputs the decoding result of the preceding signal to the replica generator 708.

The processing, after completing Step 24, returns to Step 14 and repeatedly performs steps from Step 14 to Step 24. Preferably, the steps from Step 14 to Step 24 are repeatedly performed until no errors are detected by the CRC in all of the decoding result of the preceding signal, the decoding result of the subsequent signal a, and the decoding result of the subsequent signal b.

The repeated performance of the steps from Step 14 to Step 24 allows the received signal to be separated into the preceding signal, the subsequent signal a, and the subsequent signal b, while enhancing the accuracy in estimating the channel information of the subsequent signal a and the subsequent signal b.

[g] Other Embodiments

Figure 13:
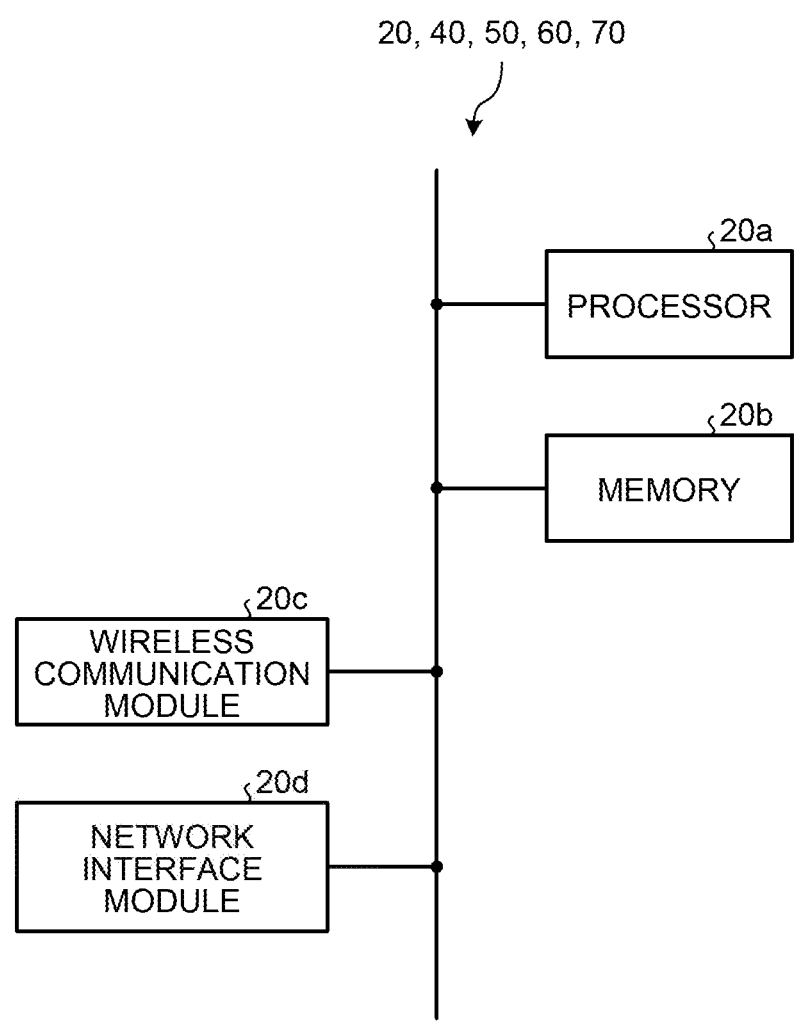
FIG. 13 is an example diagram of a hardware configuration of the access point.

The APs 20, 40, 50, 60, and 70 in the first to sixth embodiments can be each achieved by the following hardware configuration. FIG. 13 is an example diagram of a hardware configuration of the access point. As illustrated in FIG. 13, the APs 20, 40, 50, 60, and 70 each include, as hardware elements, a processor 20a, a memory 20b, a wireless communication module 20c, and a network interface module 20d. Examples of the processor 20a include, but are not limited to, a central processing unit (CPU), a digital signal processor (DSP), and a field programmable gate array (FPGA). Alternatively, the APs 20, 40, 50, 60, and 70 may each include a large scale integrated circuit (LSI) that includes the processor 20a and a peripheral circuit. Examples of the memory 20b include, but are not limited to, a RAM such as an SDRAM, a ROM, and a flash memory.

The antenna elements A1, A2, and A3, the wireless receivers 101-1, 101-2, and 101-3, the RSSI measurers 102-1, 102-2, and 102-3, and the ADCs 103-1, 103-2, and 103-3 are each achieved by the wireless communication module 20c. The received signal recorders 104-1, 104-2, and 104-3 are each achieved by the memory 20b. The preceding signal channel estimator 105, the preceding signal direction-of-arrival estimator 106, the false signal generators 107, 402, and 702, the weight generators 108, 501, 601, and 703, the weight multipliers 109, 602, and 704, the subsequent signal determiners 110 and 705, the subsequent signal channel estimators 111, 606, and 706, the separator 112, the decoders 113, 603, and 707, the subsequent signal direction-of-arrival estimators 401 and 701, the replica generators 604 and 708, and the replica subtractors 605 and 709 are each achieved by the processor 20a.

The disclosed embodiments enable separation of a plurality of signals that collide with each other, while enhancing accuracy in estimating channel information.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a plurality of antenna elements, each of the antenna elements receiving a received signal that includes a first signal and a second signal that collides with the first signal;
a first estimator that estimates first channel information that represents channel information of the first signal;
a false signal generator that generates a plurality of false signals that are equal in number to or greater in number than the number of the antenna elements, each of the false signals arriving from a unique direction that is different from a direction of arrival of the first signal and different from directions of arrival of other false signals;
a weight generator that generates a plurality of first weights, each of the first weights being associated with a corresponding one of the false signals and forming a null in the direction of arrival of the first signal;
a multiplier that multiplies the received signals received by the respective antenna elements by the first weights to acquire weight-multiplied signals;
a second estimator that estimates second channel information that represents channel information of the second signal using the weight-multiplied signals;
a separator that separates the received signal into the first signal and the second signal using the first channel information and the second channel information;
a decoder that demodulates the separated first signal using the first channel information of the first signal and demodulates the separated second signal using the second channel information of the second signal; and
the decoder then decodes the demodulated first signal and decodes the demodulated second signal.

2. The wireless communication apparatus according to claim 1, wherein the false signal generator generates the false signals that arrive from directions that fall within a predetermined range with respect to the direction of arrival of the second signal.

3. The wireless communication apparatus according to claim 1, wherein the weight generator generates the first weights, each of the first weights being associated with a corresponding one of the false signals, forming a null in the direction of arrival of the first signal, and forming a beam in the direction of arrival of the second signal.

4. The wireless communication apparatus according to claim 1, wherein the second estimator estimates the second channel information additionally using the received signal from which a replica of the first signal is subtracted.

5. The wireless communication apparatus according to claim 1, wherein
the received signal includes a third signal that collides with the first signal and the second signal, and
the weight generator generates a plurality of second weights, each of the second weights being associated with a corresponding one of the false signals and forming a null in the direction of arrival of the first signal and in the direction of arrival of the second signal.

6. The wireless communication apparatus according to claim 1, wherein
the received signal includes a third signal that collides with the first signal and the second signal, and
the second estimator estimates third channel information that represents channel information of the third signal using the received signal from which a replica of the first signal and a replica of the second signal are subtracted.

7. A wireless communication system comprising:
a first wireless communication apparatus that transmits a first signal;
a second wireless communication apparatus that transmits a second signal that collides with the first signal; and
a third wireless communication apparatus that includes a plurality of antenna elements, each of the antenna elements receiving a received signal including the first signal and the second signal, wherein
the third wireless communication apparatus:
estimates first channel information that represents channel information of the first signal;
generates a plurality of false signals that are equal in number to or greater in number than the number of the antenna elements, each of the false signals arriving from a unique direction that is different from a direction of arrival of the first signal and different from directions of arrival of other false signals;
generates a plurality of weights, each of the weights being associated with a corresponding one of the false signals and forming a null in the direction of arrival of the first signal;
multiplies the received signals received by the respective antenna elements by the weights to acquire weight-multiplied signals;
estimates second channel information that represents channel information of the second signal using the weight-multiplied signals;
separates the received signal into the first signal and the second signal using the first channel information and the second channel information;
demodulates the separated first signal using the first channel information of the first signal and demodulates the separated second signal using the second channel information of the second signal; and
decodes the demodulated first signal and decodes the demodulated second signal.

8. A method for estimating a channel in a wireless communication apparatus that includes a plurality of antenna elements, each of the antenna elements receiving a received signal that includes a first signal and a second signal that collides with the first signal, the method comprising:
estimating first channel information that represents channel information of the first signal;
generating a plurality of false signals that are equal in number to or greater in number than the number of the antenna elements, each of the false signals arriving from a unique direction that is different from a direction of arrival of the first signal and different from directions of arrival of other false signals;
generating a plurality of weights, each of the weights being associated with a corresponding one of the false signals and forming a null in the direction of arrival of the first signal;
multiplying the received signals received by the respective antenna elements by the weights to acquire weight-multiplied signals;
estimating second channel information that represents channel information of the second signal using the weight-multiplied signals;
separating the received signal into the first signal and the second signal using the first channel information and the second channel information;
demodulating the separated first signal using the first channel information of the first signal and demodulating the separated second signal using the second channel information of the second signal; and
decoding the demodulated first signal and decoding the demodulated second signal.

* * * * *